(12) United States Patent
Dozor et al.

(10) Patent No.: US 8,767,199 B2
(45) Date of Patent: Jul. 1, 2014

(54) INSPECTION SYSTEM UTILIZING SOLID IMMERSION LENSES

(75) Inventors: David M. Dozor, Tucson, AZ (US); Yullin Kim, Tucson, AZ (US); Kris Tumidajski, Tucson, AZ (US); Gary Fancher, Tucson, AZ (US); Ken Salvestrini, Tucson, AZ (US); Douglas Holt, Gilbert, AZ (US); Ron DeWitt, Jr., Tucson, AZ (US)

(73) Assignee: Infrared Laboratories, Inc., Tucson, AZ (US)

( * ) Notice: Subject to any disclaimer, the term of this patent is extended or adjusted under 35 U.S.C. 154(b) by 362 days.

(21) Appl. No.: 12/905,472

(22) Filed: Oct. 15, 2010

(65) Prior Publication Data

US 2012/0092655 A1 Apr. 19, 2012

(51) Int. Cl.
*G11B 7/12* (2012.01)
*G02B 7/02* (2006.01)

(52) U.S. Cl.
USPC ......... 356/237.2; 359/811; 359/819; 359/718

(58) Field of Classification Search
USPC ........................................... 356/237.2–237.6
See application file for complete search history.

(56) References Cited

U.S. PATENT DOCUMENTS

| | | | |
|---|---|---|---|
| 5,208,648 A | 5/1993 | Batchelder et al. | |
| 5,408,096 A * | 4/1995 | Lea et al. | 250/239 |
| 5,729,393 A | 3/1998 | Lee et al. | |
| 5,939,709 A | 8/1999 | Ghislain et al. | |
| 6,091,694 A | 7/2000 | Spath | |
| 6,377,535 B1 | 4/2002 | Chen et al. | |
| 6,643,068 B2 | 11/2003 | Mandella | |
| 6,671,246 B1 | 12/2003 | Matsuo | |
| 7,046,449 B2 | 5/2006 | Arata et al. | |
| 7,123,035 B2 | 10/2006 | Hanson et al. | |
| 7,129,454 B2 | 10/2006 | O'Connell et al. | |
| 7,414,800 B2 | 8/2008 | Isobe et al. | |
| 7,423,816 B2 | 9/2008 | Terada et al. | |
| 7,492,529 B2 | 2/2009 | Pakdaman et al. | |
| 7,535,808 B2 | 5/2009 | Ishimoto et al. | |
| 7,551,540 B2 | 6/2009 | Shinoda | |
| 7,576,928 B2 | 8/2009 | Tanabe et al. | |

(Continued)

FOREIGN PATENT DOCUMENTS

WO 97/41556 A2 11/1997

OTHER PUBLICATIONS

"Printer Carriage Motion Control." San Jose University Department of Mechanical and Aerospace Engineering, Oct. 17, 2000).

*Primary Examiner* — Michael A Lyons
*Assistant Examiner* — Rebecca C Bryant
(74) *Attorney, Agent, or Firm* — Burns & Levinson LLP; Orlando Lopez

(57) ABSTRACT

An inspection system including a lens. In one instance, the lens is a solid immersion lens. The inspection system includes a component or components for providing a self aligning solid immersion lens arrangement in order to allow at most a small distance between the solid immersion lens and a device under test and components or components for constraining a force exerted on the device under test. The inspection system may include a "purge" port, or a thermal isolation configuration or an anti-contamination component. The inspection system may include software and hardware to prevent crashing of the lens. The inspection system may also include a method for ensuring that various objective lenses can be replaced while maintaining the intended spacing between lenses.

69 Claims, 28 Drawing Sheets

(56) References Cited

U.S. PATENT DOCUMENTS

| | | |
|---|---|---|
| 7,639,025 B2 | 12/2009 | Hanson et al. |
| 7,660,054 B2 | 2/2010 | Wagner et al. |
| 2002/0191309 A1* | 12/2002 | Taylor et al. ............... 359/819 |
| 2004/0240074 A1* | 12/2004 | Pakdaman et al. ............ 359/656 |

* cited by examiner

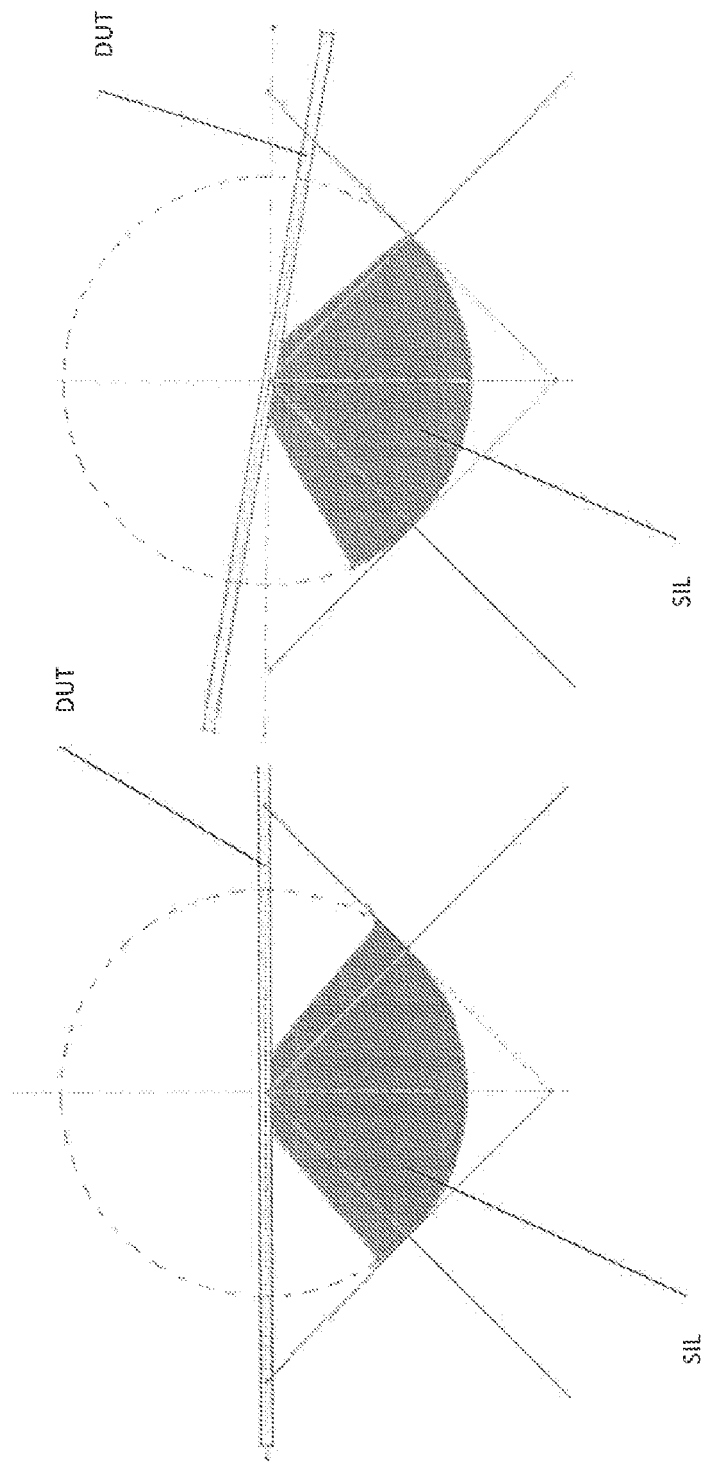

INSPECTION SYSTEM UTILIZING SOLID IMMERSION LENSES

BACKGROUND

The present teachings relate to an inspection system utilizing one or more Solid Immersion Lenses (SILs), the inspection system including silicon lenses, and a surrounding housing.

High spatial resolution imaging, in conjunction with high collection efficiency, can be used in the examination and testing of particular sub-micron structures. The size reduction of these sub-micron structures have been following the prediction made by Gordon Moore in 1965, more commonly known as Moore's Law. Within the semiconductor industry, Moore's Law stated that the maximum number of transistors able to fit within a given area will double every two years. Since the optical numerical aperture is based on the index of refraction of the medium between the objective and sample and the collection angle of the objective, the highest numerical aperture (NA) achievable by an air lens is unity.

This technology utilizes a hemispherical or cone shaped solid immersion lens (Hemi or Cone SIL) made of silicon, or any material with an index of refraction beyond that of air. Since the optical numerical aperture is based on the index of refraction of the medium between the objective and sample as well as the collection angle of the objective, the highest numerical aperture (NA) achievable by an air lens is unity. When this SIL lens is used in conjunction with a corresponding backing objective it will yield an image with both an increased magnification and numerical aperture (NA). As stated above, this increase is brought about by the simple increase in index of refraction of the SIL material versus that of air. Some of the key aspects of this technology are the correct alignment of the SIL lens onto the object under observation (or test), a large solid angle of admitted light, and ability to adjust the displacement of the SIL lens along the chief ray of the backing objective to achieve a large focal range while controlling the forces and, thereby, the stresses imparted onto the device under test (DUT). Currently, there are several known techniques for securely keeping the solid immersion lens in place.

Conventional systems exhibit instability with the landing of the SIL lens with respect to the silicon DUT. The application of downward looking, gravity-fed, and multi-mechanical-spring loaded solid immersion housings exhibit specific characteristics. One conventional example allows the SIL to float within its housing, using gravity to settle the lens upon contact with the Device Under Test (DUT). Thus, when the SIL touches down on the DUT, the housing is lifted from the SIL, removing all sources of thermal contact. The SIL lens simply "sits", or "is placed", on top of the DUT. However, due to normally occurring surface irregularities due to the preparation of the surface, the SIL will not properly couple to the DUT, greatly degrading SIL imaging. In addition, the lateral position of the SIL with respect to the DUT cannot be repeatably located.

DUT flatness is important, as gaps between the SIL lens and DUT, brought about by SIL lens tilt or sample preparation, produces aberrations and makes high resolution observation difficult.

In another conventional implementation, pressure is applied and regulated to control the SIL lens with respect to the DUT. A stress/pressure sensor is used as a feedback device to control and adjust the amount of pressure on the DUT.

In the above described conventional systems, the excessive force is typically produced by, among other factors, the lack of effective control of the angle between the solid immersion lens (SIL) and the device under test (DUT). The angle of the solid immersion lens with respect to the backing objective and the device under test, in conventional systems, is typically rigid in the tip and tilt directions of motion. The rigidity is typically due to:

a. conventional lens design attempts to constrain five degrees of motion of each lens with respect to the other (rotation about the chief ray is not controlled—axisymmetric assumption) This results in a rigidly fixed SIL lens, which has little angular compliance, and b. the spring rate of the "SIL holder" along the direction of the chief ray, as well as in the tip and tilt directions, is very difficult to reduce. This is due to the traditional use of coil-over designs, which require some preload force, and tight clearance components, which slide with respect to each other, to avoid backlash. Backlash degrades image performance due to non-repeatable lateral displacements.

In conventional systems utilizing "coil (spring) over" designs, the preload of the spring must be overcome before the SIL can move with respect to the backing objective. Therefore, a contact force "penalty" must be paid. In addition, these systems, which are prevalent, exhibit backlash between the sliding elements, which gives rise to "SIL Wobble"—a lack of landing repeatability of the SIL onto the DUT. This prevents the ability to effectively localize small features and/or to assemble multiple images into a mosaic array difficult.

Yet another conventional implementation uses various sensors to determine both the touchdown point and pressure applied towards the object under observation. These sensors are housed in a slide-able mount with respect to the backing objective which in turn is controlled by either a linear or non-linear resistive force. The main focus is on a solidly attached SIL lens and a backing objective housing that adjusts the relationship between the SIL lens and the backing objective. Still another conventional implementation is an optical metrology system focusing on the interferometric and spectroscopic applications using an air bearing type mechanism, in which the lens floats above the wafer via fluid or air. No physical contact is actually made. This method often fails to function properly due to the need for (at least) evanescent coupling of the SIL to the DUT, which cannot be achieved due to surface irregularities and non-flatness and the fact that the design does not allow for an appropriate amount of angular compliance. In addition, the lateral position of the SIL cannot be repeated with a high degree of precision. The high contact force and lack of angular conformance between the SIL and the DUT also degrade the ability of the SIL to be focused at various depths, which is often necessary due to sample preparation issues.

Some conventional implementations of SIL-based objectives draw heat (or drive heat) from (into) the DUT, dropping (raising) the temperature of the DUT in a localized area where the fault, failure, or region of interest is located. These methods are complex and very slow to respond, failing to ensure adequate control of the temperature of the DUT immediately beneath the SIL due to the low thermal impedance between the high conductivity SIL and its housing and the high thermal mass of various components

BRIEF SUMMARY

In one embodiment, the system of these teachings includes a solid immersion lens, the solid immersion lens being at least a portion of a hemisphere, a housing, the housing having one end, the solid immersion lens being mounted on the one end, the one end including a solid immersion lens receiving surface; the solid immersion lens receiving surface being sized to receive the solid immersion lens and to allow solid immersion lens rotation with respect to the solid immersion lens receiving surface.

The embodiment also includes a retaining component operatively connected to the housing; the retaining component having a substantially central retaining opening; an area of the substantially central retaining opening being smaller than an area of the substantially central opening, the retaining component being sized to allow rotation of the solid immersion lens with respect to the receiving surface and such that the solid immersion lens is retained in the housing.

In one instance, the solid immersion lens is a truncated section of the hemisphere. In one embodiment, the truncated section having a predetermined angular width, the hemisphere being truncated at a predetermined distance away from a center of the hemisphere, the predetermined distance and the angular width being determined in order to obtain a predetermined numerical aperture and a predetermined possible angular rotation.

In another instance, the housing also includes a top surface disposed a predetermined height away from a center of the hemisphere; the top surface having a substantially central opening; a characteristic dimension of the substantially central opening being selected to allow placement of the solid immersion lens onto the receiving surface. The retaining component is operatively connected by being disposed on the top surface and attached to the housing or the top surface utilizing conventional attachment designs.

In another embodiment, the truncated section is obtained by the intersection of the hemisphere, the hemisphere constituting a first hemisphere, with an angular section of a second hemisphere; the second hemisphere having a radius larger than the radius of the first hemisphere.

Other instances of solid immersion lenses are also within the scope of these teachings.

In another embodiment, the system includes a thermal isolating layer contacting at least a portion of the SIL receiving surface. The thermal isolation layer and the housing constitute a thermal path.

The design of the present teachings isolates the low thermal mass, high thermal conductivity SIL from the backing objective, allowing it to better track the temperature of the DUT, whose temperature is desired to be controlled to substantially within ±1° C. at the point of observation. The temperature of the isolated SIL is more quickly and readily changed than when it is part of a higher thermal mass system.

In yet another embodiment, the housing in the system has another end disposed a distance away from the one end; and an outer surface extending from the one end to the other end and the outer surface includes a number of flexures; the flexures being proximal to the receiving surface, the number of flexures and dimensional characteristics of the flexures being selected such that a force exerted by the solid immersion lens on a device under test does not substantially distort or damage the device while providing an adequate focal range. The use of flexures obviate the issues of backlash/SIL Wobble, and excessive contact force due to preload while providing appropriate constraints and compliances in all directions to enable high resolution imaging.

In one instance, the outer surface has a port connecting an exterior of the outer surface to a channel disposed interior to the outer surface, a cleaning gas introduced through the port being able to propagate through the channel in order to remove condensation from the solid immersion lens and other optical components.

Methods for using the system of these teachings are also disclosed.

In still another embodiment, the system includes an anti-contamination component disposed over the retaining component, the anti-contamination component extending beyond the retaining component and in contact with the solid immersion lens, the anti-contamination component substantially preventing contamination from entering a region between the solid immersion lens and the receiving surface.

In another embodiment, the anti-contamination ring applies suitable force to hold the SIL to the solid immersion lens receiving surface of the housing to allow its operation in any orientation.

In another embodiment, the anti-contamination ring applies suitable angular restoring force such that the SIL will always be presented to the DUT surface within a range of substantially nominal tip and tilt angles to guarantee ease of use while not imparting excess angular stiffness, which is responsible for sample damage.

In another embodiment, to ensure that the SIL cannot over travel, thus damaging the SIL, the backing objective, or the DUT, there is a crash protection switch that is integrated into the assembly.

In another embodiment, there is a tip-tilt table utilized, but not mostly for angular alignment of the DUT to the SIL tip, because the present teachings accommodate this, but rather to ensure that Abbe error, which occurs as a result of tilt, can be minimized when there is a large difference between the nominal and actual sample thickness. If the present invention did not provide such a large focal range, a tip-tilt table might never be necessary and is generally only used in the most stressing applications where image overlay is used with GDSII Data.

Some embodiments include a lens mount that can substantially maintain parcentricity and parfocality.

Other embodiments are also within the scope of these teachings.

The system of the present teachings can be integrated within any form of microscope based systems requiring the imaging of features smaller than that which the highest numerical aperture air-spaced objective, unity, can resolve. The presented art utilizes a high refractive index SIL lens, that is coupled to an object (i.e. DUT) that has an index of refraction equal to or greater than the SIL lens itself. The housing can be constructed around any given numerical aperture backing objective lens, provided that the backing objective is suitably compensated for certain traditional aberrations. See FIG. 3d.

One aspect of the present teachings is that the technology can exploit the optical effects known as evanescent waves and the amount of force required to ensure optical coupling between the solid immersion lens and observed object. Evanescent waves are formed when an incoming sinusoidal wavefront reflects off an interface greater than the critical angle, such that total internal reflection occurs. In other words, as light propagates from the SIL to the substrate, the wave-number in the second medium, the substrate, becomes imaginary. When this occurs, it is said that the wave in the second medium is evanescent, and the wave in the first medium undergoes total internal reflection. This evanescent wave will then broaden to some given depth into the second medium and exponentially decay. As a result, if the "contact" between the planar side of the SIL and substrate are at a given height in which these evanescent waves are still strong enough to force photons into the "frustrating medium" then FTIR (Frustrated Total Internal Reflection) occurs and energy is allowed to flow from medium to medium. These teachings take into account this effect, in addition to the current polishing and surface preparation standards of the industry, thus allowing the ability to create highly spatially resolved images with appropriate solid-to-solid contact. The required contact force between the SIL and the DUT must be no greater than that required to enable solid-to-solid and/or evanescent coupling at the all points corresponding to the object plane field of view.

Another aspect of the present teachings is the on-axis alignment of a specific structure. The conventional application of downward looking, gravity-fed, and multi-mechanical-spring loaded solid immersion housings often exhibit an inaccuracy of SIL placement on the object of interest, referred to as "SIL Wobble".

One conventional implementation presents a "slide-able" SIL housing design, in which the same mechanics that allow the SIL lens to slide along the optical axis gives way to a de-centration of the SIL lens itself. An example of this "SIL-Wobble" can be seen in the current field of semiconductor failure analysis (FA). "SIL-Wobble" causes a non-repeatable image acquisition due to the decentration of the SIL and also the inability to control the touchdown location of the SIL (only the placement of the backing objective is inferred from the metrology).

In the typical applications of FA, a user will have a region in which a specific object of interest needs to be placed at an exact location within the detector field of view. With the use of a stage in which the SIL lens will focus the objective to the DUT, the mechanics of the present teachings will allow the image formed by the SIL lens to be placed within the resolution of the pixel size in object space. With the ever decreasing size of the transistor, this accuracy of the presented art, allows the SIL lens to easily stitch adjacent images, thus creating very large field of view, high resolution images.

Conventional implementations related towards upward looking cameras, rely on the angular placement and optical quality of the DUT with respect to the SIL tip. The natural methodology of compensating for this angular misalignment is to present a Tip-Tilt Table for the DUT. This table allows the DUT to be placed at varying angles in order for the SIL tip to best contact the DUT, allowing the incident light to propagate through the silicon substrate. There are cases in which the SIL, when contacting the DUT, will actually crack or damage the DUT, thus causing a contact failure. In this case the DUT becomes inoperable, or cannot be inspected, due to the stress created by the measuring device, the SIL tip.

For a better understanding of the present teachings, together with other and further needs thereof, reference is made to the accompanying drawings and detailed description and its scope will be pointed out in the appended claims.

BRIEF DESCRIPTION OF THE DRAWINGS

FIGS. 5a-5d show a Cone and Hemisphere based embodiment of SIL lenses in Housing bearing seat, according to these teachings, contacting the DUT at both normal and angular rotations to the optical axis;

DETAILED DESCRIPTION

Figure 1:
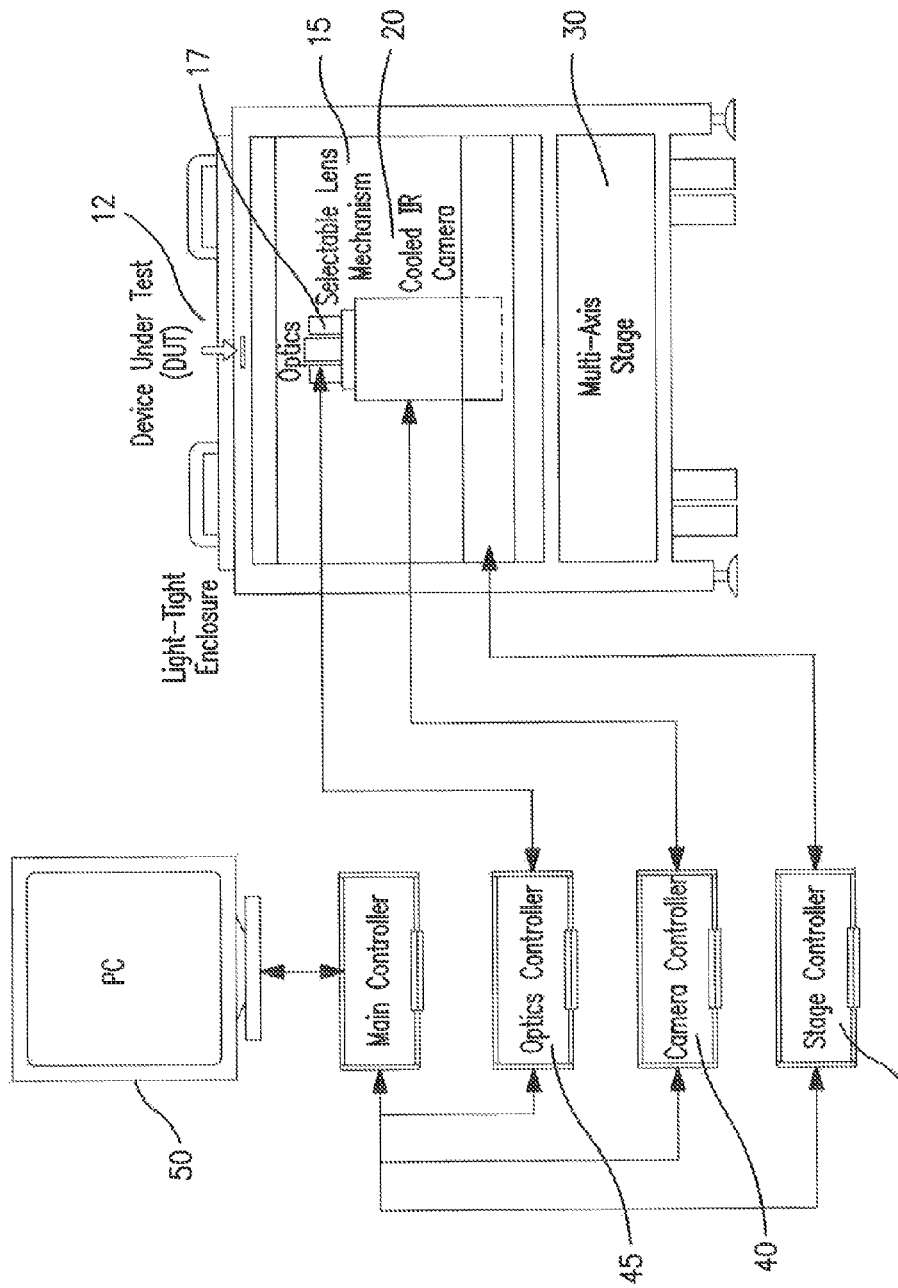
FIG. 1 shows an looking Infrared Microscope System.

"Parfocality," as used herein, refers to the target (such as the device under test) staying in focus when the lens combination is changed.

"Parcentricity," as used herein, refers to an object in the center of the field staying in the center of the field no matter which objective is being used.

In one embodiment, the system of these teachings includes a solid immersion lens, the solid immersion lens being at least a portion of a hemisphere, a housing, the housing having one end, the solid immersion lens being mounted on the one end, the one end including a solid immersion lens receiving surface (also referred to as the housing bearing seat or the bearing seat); the solid immersion lens receiving surface being sized to receive the solid immersion lens and to allow solid immersion lens rotation with respect to the solid immersion lens receiving surface; and a top surface disposed a predetermined height away from the center of the hemisphere, the top surface having a substantially central opening; a characteristic dimension of the substantially central opening being selected to allow placement of the solid immersion lens onto the receiving surface. The embodiment also includes a retaining component disposed over the top surface; the retaining component having a substantially central retaining opening; an area of the substantially central retaining opening being smaller than an area of the substantially central opening, the retaining component being sized to allow rotation of the solid immersion lens with respect to the receiving surface and such that the solid immersion lens is retained in the housing.

In one instance, the solid immersion lens receiving surface has at least one material disposed on it in order to increase lubricity. In one embodiment, the material can be an oil. In another embodiment, the material can be Teflon impregnated material. In yet another embodiment the material can be a graphite impregnated material.

In one instance, the housing in the system has another end disposed a distance away from the one end; and an outer surface extending from the one end to the other end and the outer surface includes a number of flexures; the flexures being proximal to the receiving surface, the number of flexures and dimensional characteristics of the flexures being selected such that a force exerted by the solid immersion lens on a device under test does not substantially distort or damage the device while providing sufficient force to couple to the DUT for imaging.

In one aspect, the present teachings accommodate for the optical surface quality and irregularity of the IC device. To ensure high contrast, high resolution imaging performance over a variation of silicon depths, the design has been optimized with respect to the theoretical Strehl Ratio. By use of this information, a substantially optimal SIL radius and thickness can be found.

Due to the nature of the present teachings, the angular movement of the SIL lens can move freely along the tangential lines of the SIL holder (or bearing seat). With this ability, and the natural hardness of Silicon, we are able to utilize the higher NA for IC failure analysis. In addition, the SIL lens when used as a cone-shape or any shape thereof, will need to be restricted to make a robust system that can be used as a commercial product and utilized in any orientation—upward looking, downward looking, side looking, and/or any combination thereof. As a result, a retaining ring is placed over the cone and is designed such that it allows a preferential amount of freedom for SIL lens angular motion. In other embodiments, a flexured retaining component can provide the force to hold the SIL onto the receiving surface.

There is also an anti-contamination ring (ACR) made to be elastic and flexible as to not provide any unnecessary pre-load or constraints onto the SIL lens itself, while providing a very low stiffness angular restoring force that ensures that the SIL is always presented to the DUT in its substantially nominal angular orientation. In other embodiments, the ACR serves to restrict the motion of the SIL. In those embodiments, the retaining ring is not used. In those embodiments in which the retaining component is not used, the anti-contamination component is operatively connected (attached) to the housing. In some of the embodiment shown, the anti-contamination component is disposed over the top surface. (The term "disposed over the top surface" is used herein in the same manner as it is used with respect to the retaining component.) The anti-contamination component increases the angular stiffness of the solid immersion, adding stiffness to tip and tilt with respect to the solid immersion lens receiving surface (bearing surface). It should be noted that the anti-contamination component can be attached to the housing by one of a variety of conventional attachment designs. In one instance, the anti-contamination component can be fitted into an indented area in the housing and a polymer material (such as RTV) used to assist in the fitting and to set the anti-contamination component in the indented area. In other embodiments epoxy could be used, as well as shrink fitting or electron-beam welding or some other type of welding when the anticontamination ring is fitted with a metallic ring on its outer edge.

Again, since the present teachings utilize a high-precision tangential bearing surface, the ACR does not allow or limits the amount of contamination from the environment in which it is installed. It also allows the SIL cone-shape or any similar characteristic to be held concentric with respect to the objective. This will allow the entire SIL assembly to be used in any orientation, as long as the sample is placed within a perpendicular field of view of the SIL lens itself.

Not only has the ACR provided the listed capabilities and characteristics, the durability has been tested to be high. Landings have been on the orders of tens of thousands.

In addition, the ACR is made from a very low thermal conductivity, low thermal mass material to ensure that adequate thermal isolation of the SIL lens is observed.

Through consideration of sample depth, or more specifically in the IC failure analysis industry, backside silicon thickness, with respect to the theoretical Strehl ratio vs. wavelength, an optimized SIL lens was found. In order to fully utilize this information, the SIL housing and the amount of force with respect to sample thickness has been optimized with the use of flexures cut near or about the tip of the SIL lens. The flexure design based methodology used in the present teachings allows the appropriate amount of force to be obtained versus sample thickness. Conventional technology uses an amount of force that often greatly exceeds the yield strength of the silicon material itself with respect to IC silicon thickness. The resulting effect is that the silicon often yields and or fractures and dimples are placed in the silicon itself. Overall, due to the amount of force that other SIL housings require in order to obtain an image, the IC silicon is damaged, sometimes damaging the IC layers within the semiconductor device itself. The present teachings of flexure design allow for a wide focal depth range that does not place any physical characteristics of the SIL onto the sample. These flexures provide no breakaway force, thereby limiting the "force penalty" that other designs pay to begin imaging. In addition, the flexures and housing are constructed such that the change in force over the range of focus is very small. This guarantees that the DUT is not damaged and the focal depth can be altered by refocusing the backing objective by changing the relative displacement of the SIL with respect to the backing objective. Lastly, the flexures form a long and circuitous path (also referred to as an isolated path) for any heat flux that might be conducted through the SIL to the housing, thereby presenting a large thermal resistance and isolating the backing objective from the DUT and SIL.

The flexures serve a few purposes:
a. The flexures guarantee that there is NO breakaway force, such as occurs with a "coil over" design, which, as I mention in the Prior Art Section, issues a contact force "penalty".
b. The monolithic nature of the flexures guarantees that there is no "stiction", which adversely impacts the current designs by not allowing the focus to be finely controlled.
c. The flexures allow us to design the various directional compliances to ensure that the SIL remains aligned with the backing objective while providing motion along the chief ray for focusing.
d. The flexures force any heat flux that gets through the SIL and into the housing, which will be small by design, to take a rather long and circuitous route to get to the backing objective. Therefore, we thermally isolate the backing objective.
e. The flexure type/style allows tailoring the design and manufacture to various customer specifications.

As shown in FIG. 1, one method of semiconductor failure analysis inspection of a semiconductor device requires a high precision XYZ stage, an image sensor to detect emissions resulting from design or processing faults and, a methodology of acquiring and analyzing the output data from the image sensor. A semiconductor device under test (DUT) is located on top of a light-tight enclosure, which houses the XYZ stage. The high precision XYZ stage moves the imaging camera and optics over an area of interest. Where X and Y move the camera and optics assembly horizontally across the DUT, and Z is in relation to the optical axis, or focus in the vertical direction. In the system shown in FIG. 1, the system includes a selectable lens mechanism with a number of possible lens configuration (three are shown).

Images are obtained by the illumination process or via infrared emission of radiation from the CMOS transistors which is gathered by the selected optics onto the imaging sensor. The user has the ability to select from a series of different optical lenses which allow for various magnifications to be placed over the camera. These different lens magnifications coupled with the high resolution stage gives the user the ability to gradually decrease their field and increase magnification and resolution of the object under observation. In the case of a semiconductor IC, this allows the individual transistors to be viewed and observed. As these transistors shrink smaller and smaller, higher and higher numerical apertures (resolution) are required and, when using the same imaging sensor, higher magnification lenses are needed.

During operation, the system of these teachings initially selects a low power lens to give an image of the entire DUT. At this point, if a higher magnification is required for a detailed image process analysis, the selectable lens mechanism moves a higher magnification objective over the camera window. The image acquisition process is either through reflected illuminated light, which allows the visibility of various metallization and transistor structures, or through the collection of emitted light, known as photon emissions, due to the conduction of the CMOS transistors, which might vary due to various faults within the integrated circuit IC. The collection of these emitted photons is dependent upon the light gathering ability of the optics and image sensor characteristics. The signal acquired by the image sensor is then processed in order to observe the characteristics of the emitted signal. As stated above, the goal is to resolve the actual transistor fault within the IC. As these gates shrink the optical resolution needs to similarly decrease. Resolution is typically understood by Raleigh's Criterion: $R_{airy}=0.61\lambda/NA$; where $\lambda$ is the wavelength of the light and NA the numerical aperture of the chosen optic. Since the resolution is dependent on the numerical aperture (NA) of the optics, which is defined by $NA=n\sin\theta$, where n is the index of refraction and $\theta$ the half angle of the incoming cone of light, the NA can be increased (improving the resolution) by either increasing n or $\theta$. This resolution improvement method is similarly found in infrared astronomy. The detection of weak stars or photon emissions requires an increase in NA of the optics which is obtained by increasing the NA of the medium between the optic and object under observation. It has been shown that the thickness of the SIL lens is constructed by relating the radius of curvature of the SIL lens to the thickness of the substrate of the DUT and the field size. Silicon naturally has a high index of refraction of 3.5, thus allowing the NA, in addition to the magnification, to be increased with respect to n. As a result, silicon was chosen so that there is no mismatch in n with respect to the DUT material which is typically silicon in semiconductor ICs. As an added benefit, silicon has high thermal conductivity and low coefficient of thermal expansion, thus allowing a more thermally stable SIL lens. This reduces the influence of the SIL on the DUT in addition to minimizing the gradients within the SIL itself when the DUT is operated over a wide range of temperatures during testing.

Figure 2:
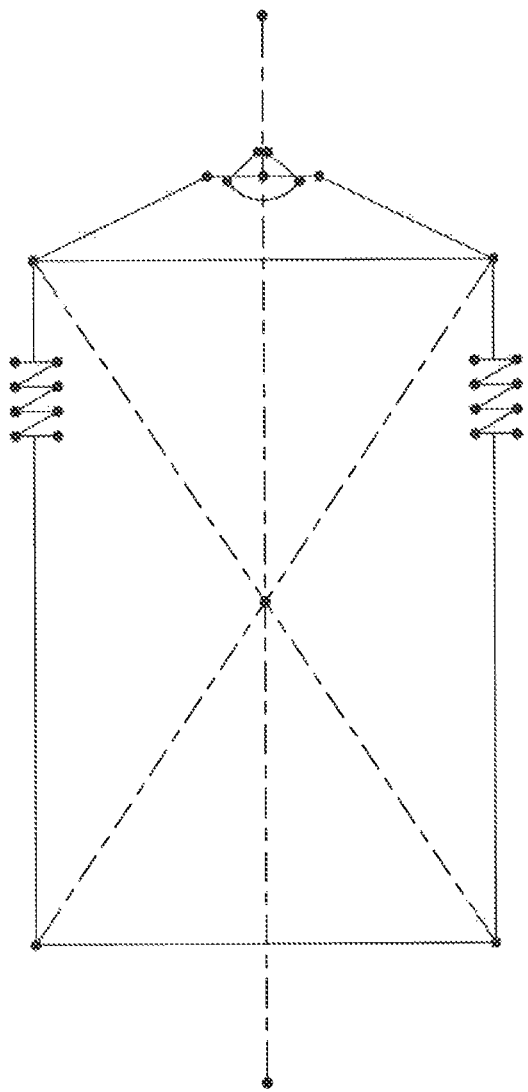
FIG. 2 shows a schematic drawing of one embodiment SIL lens (Cone Shaped) and Backing Objective Housing of these teachings.
Figure 3:
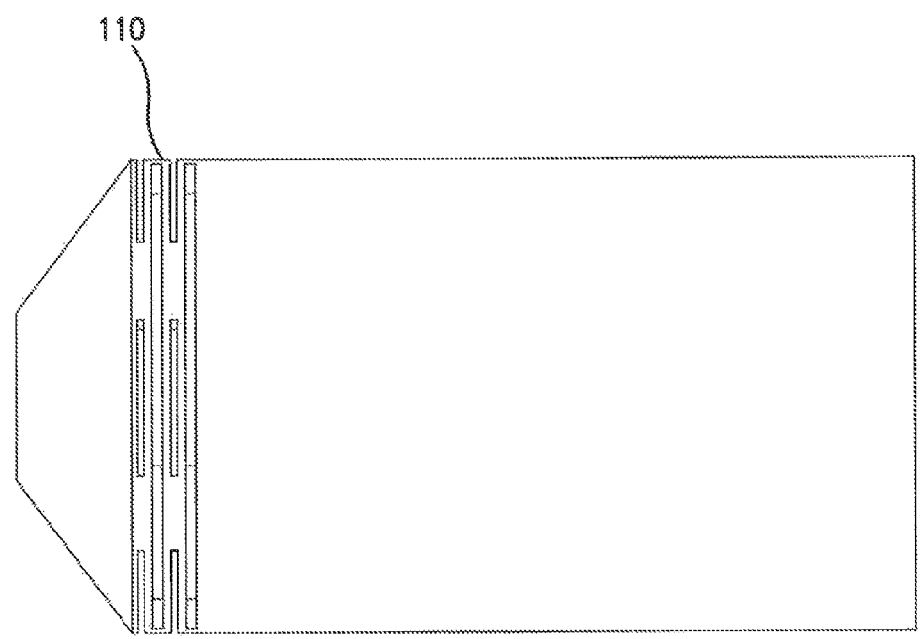
FIG. 3 shows a side view of one embodiment of a Housing with Flexure based compression mechanism of these teachings.
Figure 3A:
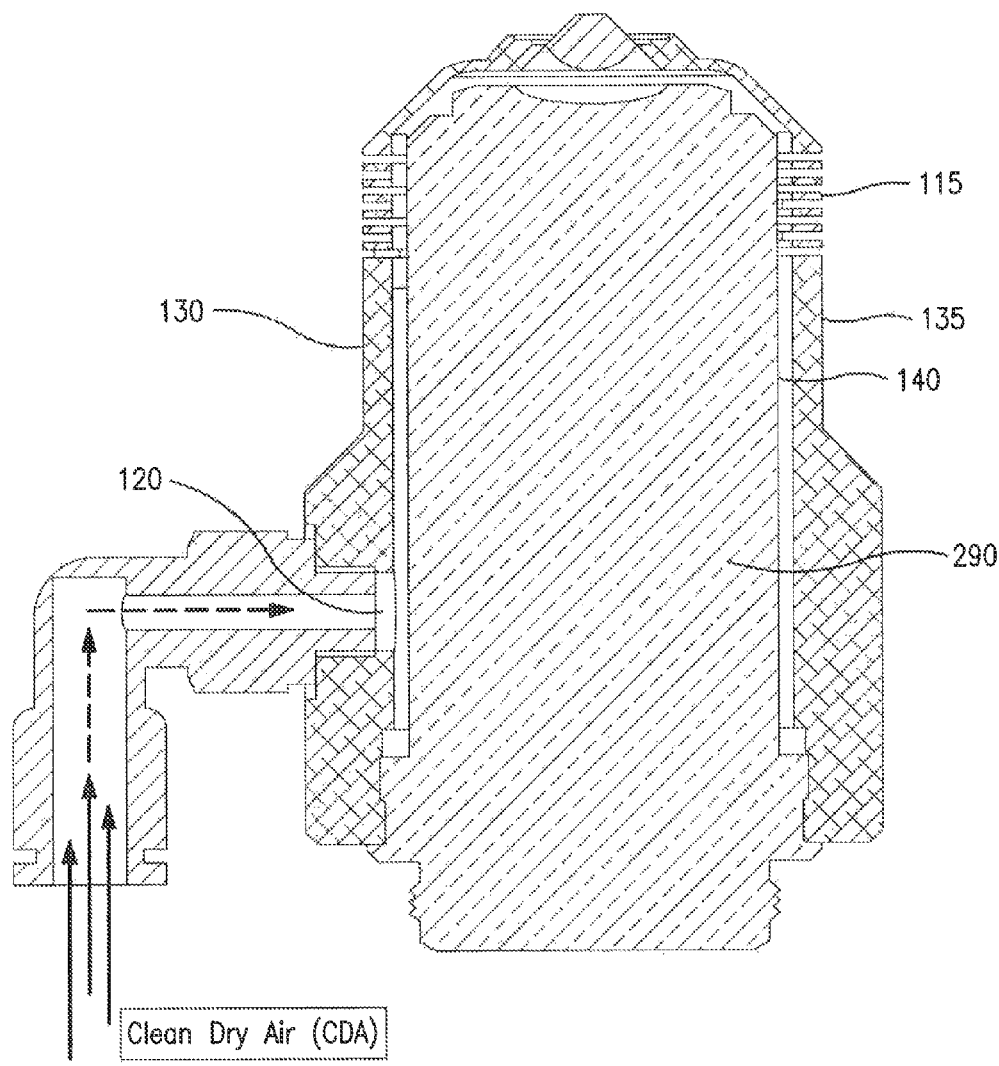
FIGS. 3a, 3b, 3c, 3d shows a cross-sectional view of one embodiment of a system of these teachings.

In FIGS. 2 and 3, 3a, the SIL Housing incorporates a flexure design. This design constructs a system in which the stress imparted to the DUT does not exceed the yield stress of the DUT and that the lowest required force needed to ensure (at least) evanescent coupling between the SIL lens and the DUT can be attained when focusing at an appropriate depth. By carefully controlling the number of flexures used, their length, and their thickness, any desired force can be "dialed in" while providing appropriate stiffness in the other directions needed to ensure imaging performance. Due to the nature of silicon and thickness of silicon on top of the IC layers, the yield strength of the material is taken into account such that the amount of force placed on the DUT does not allow the SIL lens tip to distort and damage the material. In order to correctly choose a flexure material that will allow for a delivery of nearly constant force throughout the range of focus, the material must meet basic guidelines that will successfully construct a flexure: appropriate thermal and elastic properties (such as, but not limited to, linear elastic behavior), where the load will not exceed the elastic limit of the material.

Referring to FIG. 3, three flexure groups (or layers) 110 are shown therein. In the embodiment shown in FIG. 3a, six flexure groups (or layers) 115 are shown. In embodiments in which a portion the housing is substantially a cylindrical tube, as shown in FIG. 3a, the flexures are formed by making slots into the side 135 of the tube. Considering a single slot, the slot has some angular extent. If two of these slots are 170 degrees of extent, then there will be areas that connect the two sides of the tube occupying 10 degrees each. In general, there are a number of slots, n, of angular extent $(360°/n)-m$, where m is the angular extent of the connected area. These can be repeated by making the slots in a second group below the first group, but the slots in the second group must be rotated so that the slots and connected areas do not line up. Each of the flexures formed by the slots can be considered as a beam fixed at both ends (referred to as a "fixed-fixed" beam). The behavior of the "fixed-fixed" beams can be determined. In one instance, special coatings are used on the assembly of flexures. In that instance, each flexure behaves as a composite structure. The layers of flexures behave similar to springs in series. From these relationships the behavior of these flexures can be determined and the desired forces obtained. FIGS. 3i and 3j illustrate results obtained for different designs. In addition, these flexures have thermal properties, with the desired effect of making it more difficult for heat to leave or enter the SIL from the backing objective or visa-versa.

Figure 3B:
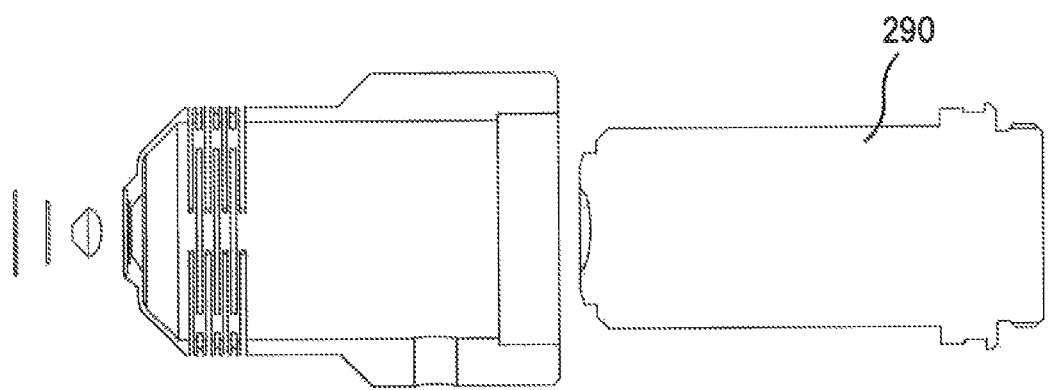
Figure 3C:
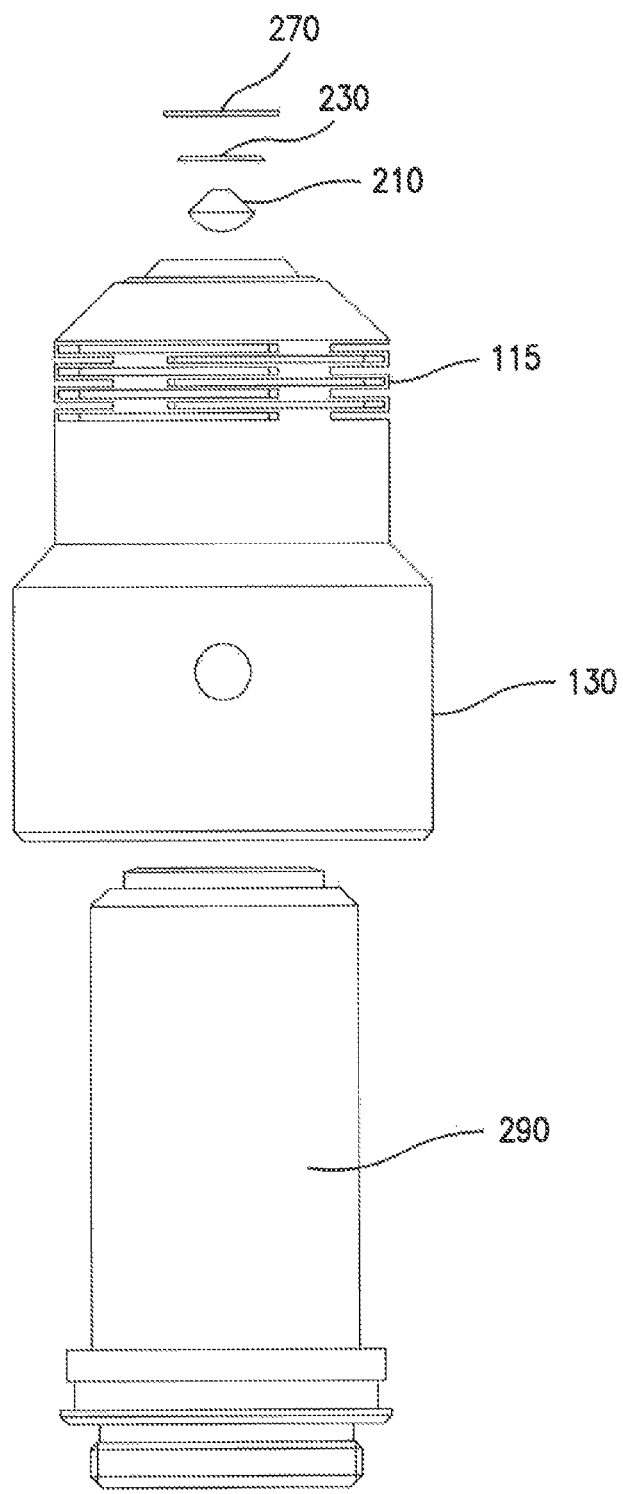
Figure 3D:
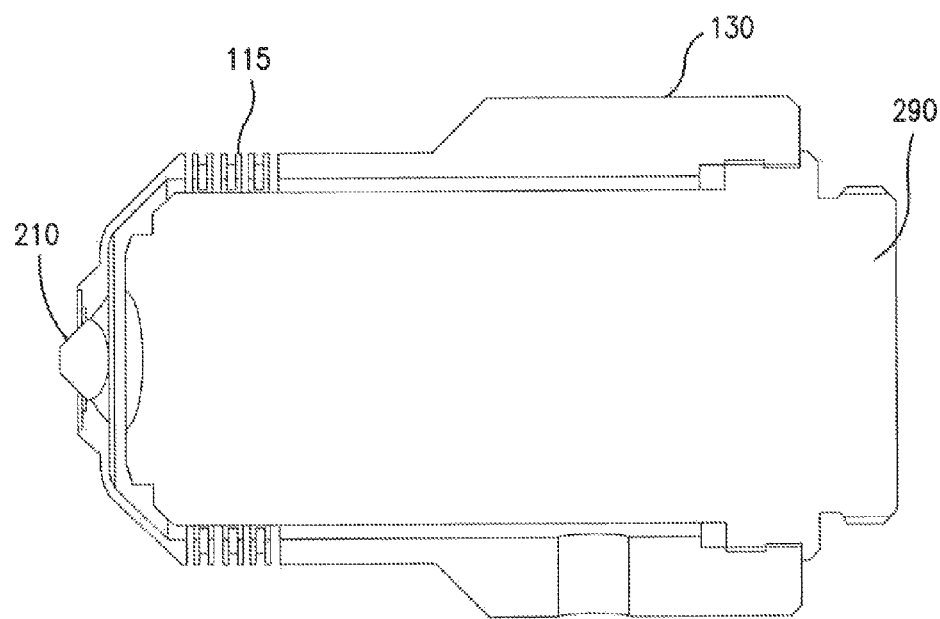
Figure 5D:
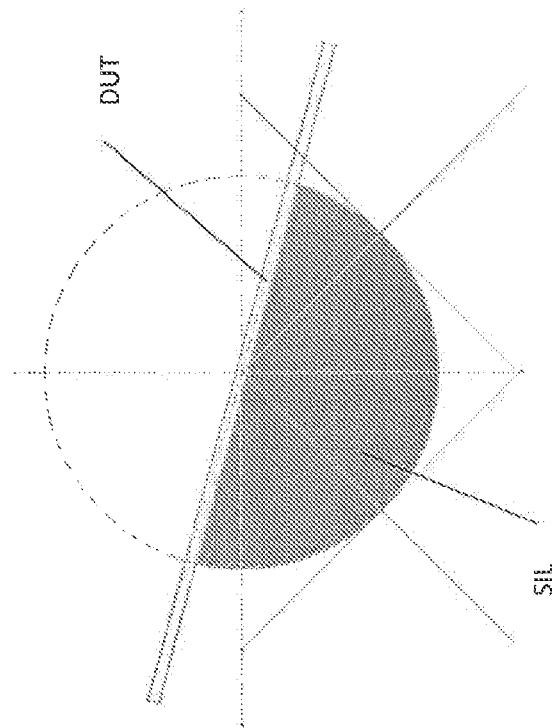
Figure 5C:
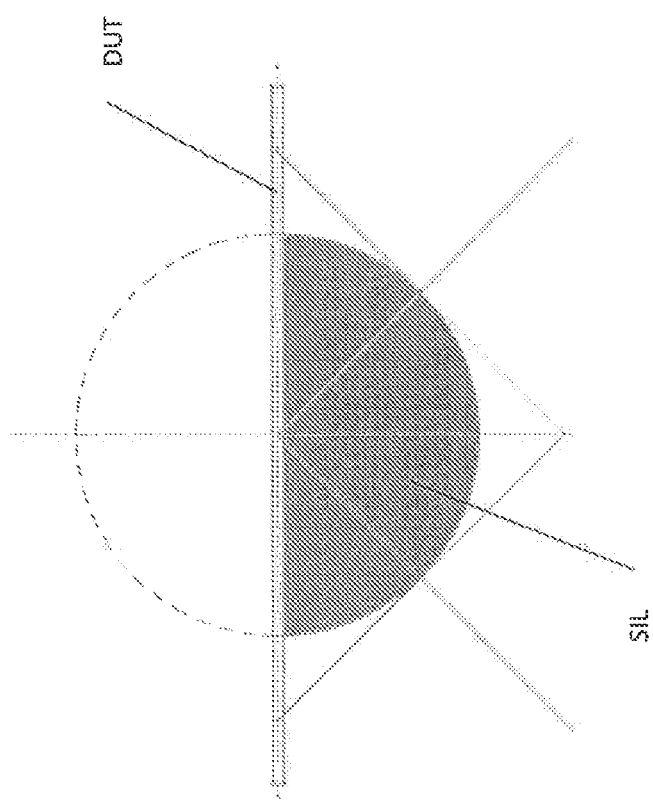
Figure 5E:
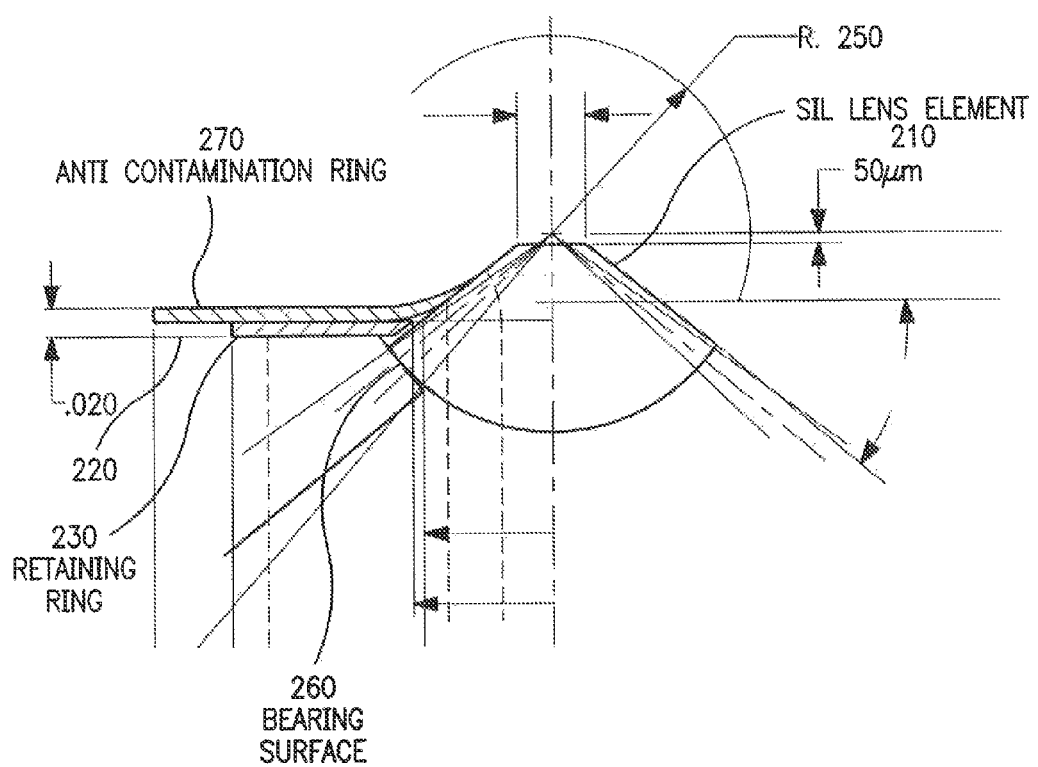
FIGS. 5e, 5f, 5g show embodiments of a solid immersion lens, retaining component and anti-contamination component of these teachings.
Figure 5F:
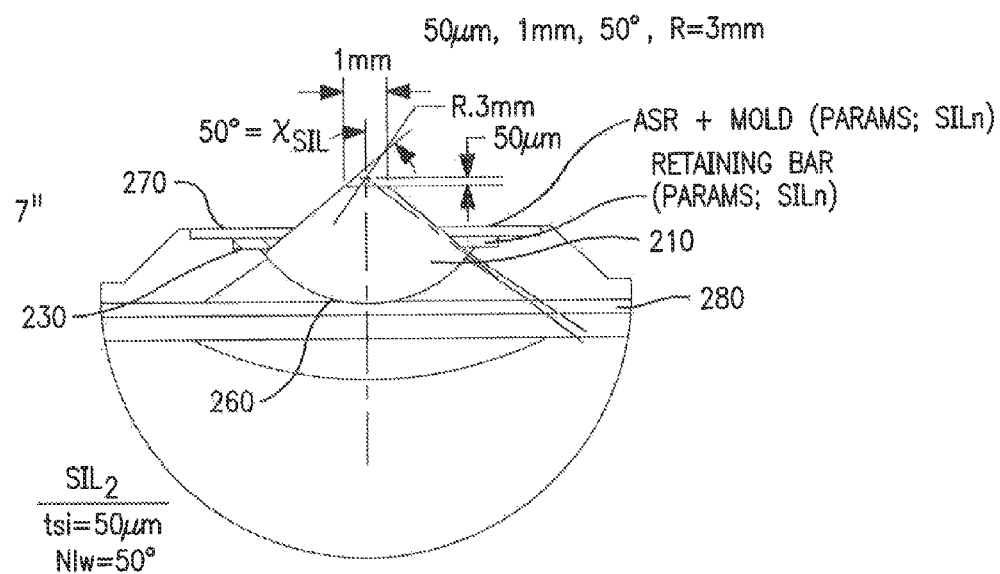

FIGS. 3b, 3c show an exploded view of the embodiment of the system of these teachings with three flexures, FIGS. 5e-5f show a detailed view of an embodiment of the solid immersion lens assembly of these teachings. The embodiment shown in FIGS. 3b and 3c shows the SIL 210, the housing 130, the flexures 115 the retaining component 230, the anti-contamination component 270 and the objective 290. The embodiment shown in FIGS. 5e-5f shows further details of the retaining componet 230 and the anti-contamintion componet 270. FIG 3d shows the assembled system (similar to FIG. 3a). It should be noted that, in some embodiments the retaining component is not used and in some other embodiments, the anticontamination component is not used.

Figure 3E:
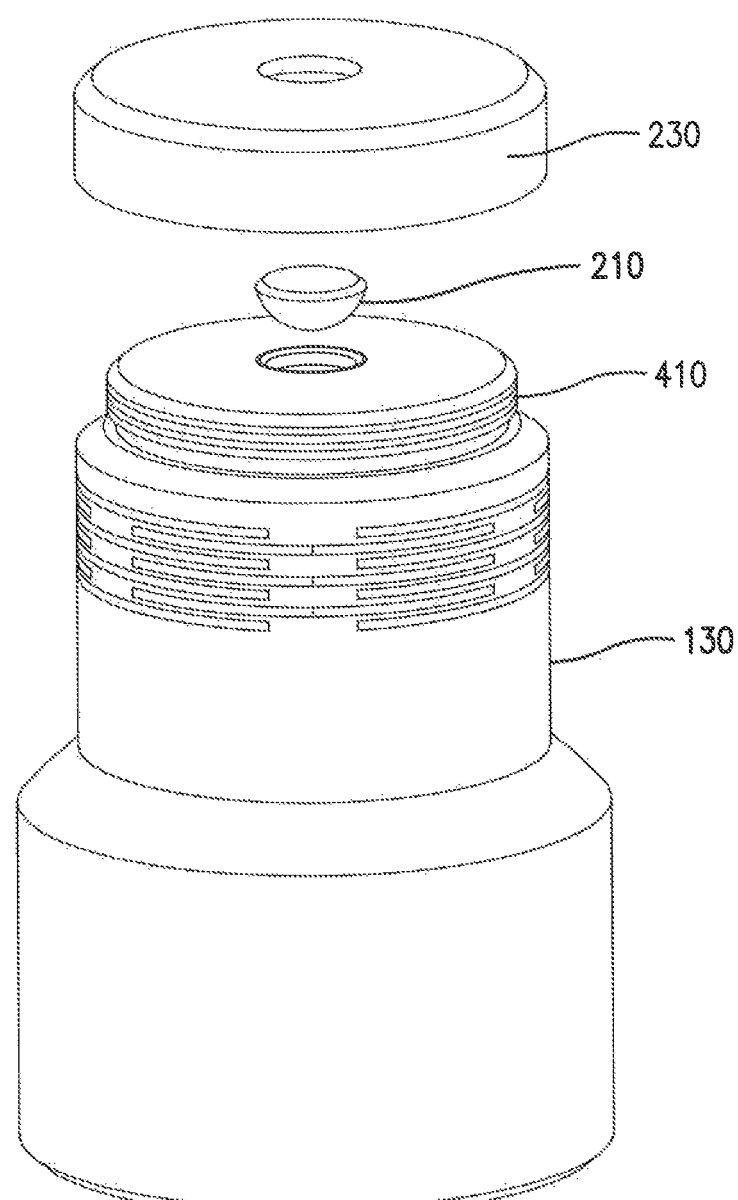
FIGS. 3e, 3f, 3g, 3h show a cross-sectional view of another embodiment of a system of these teachings.
Figure 3F:
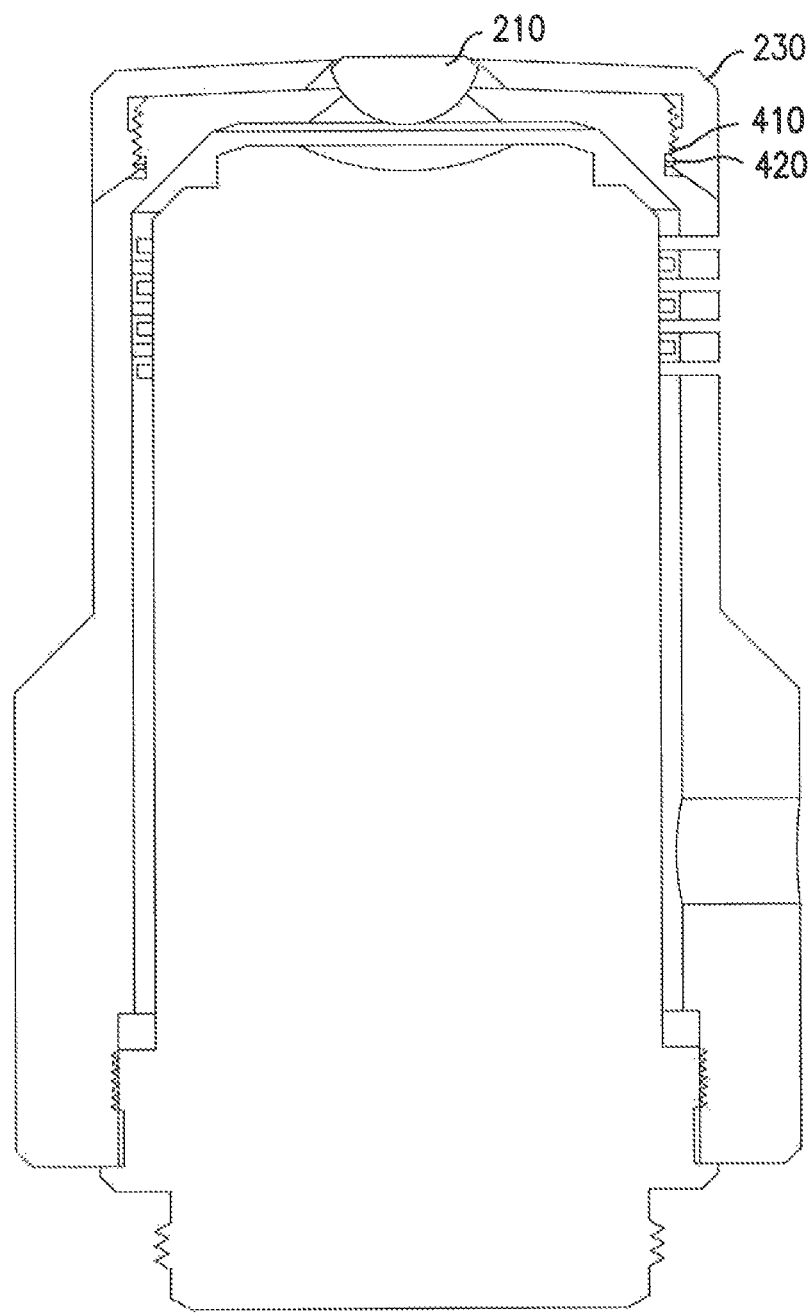
Figure 3G:
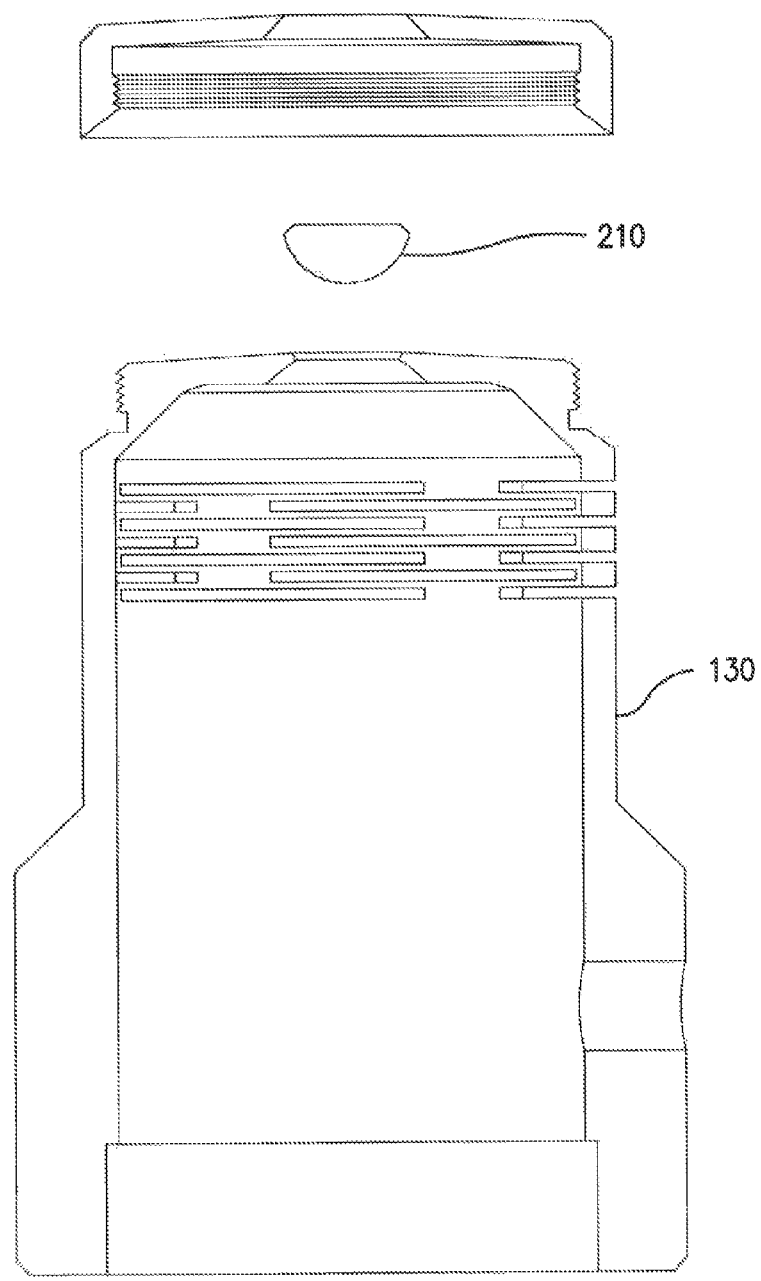
Figure 3H:
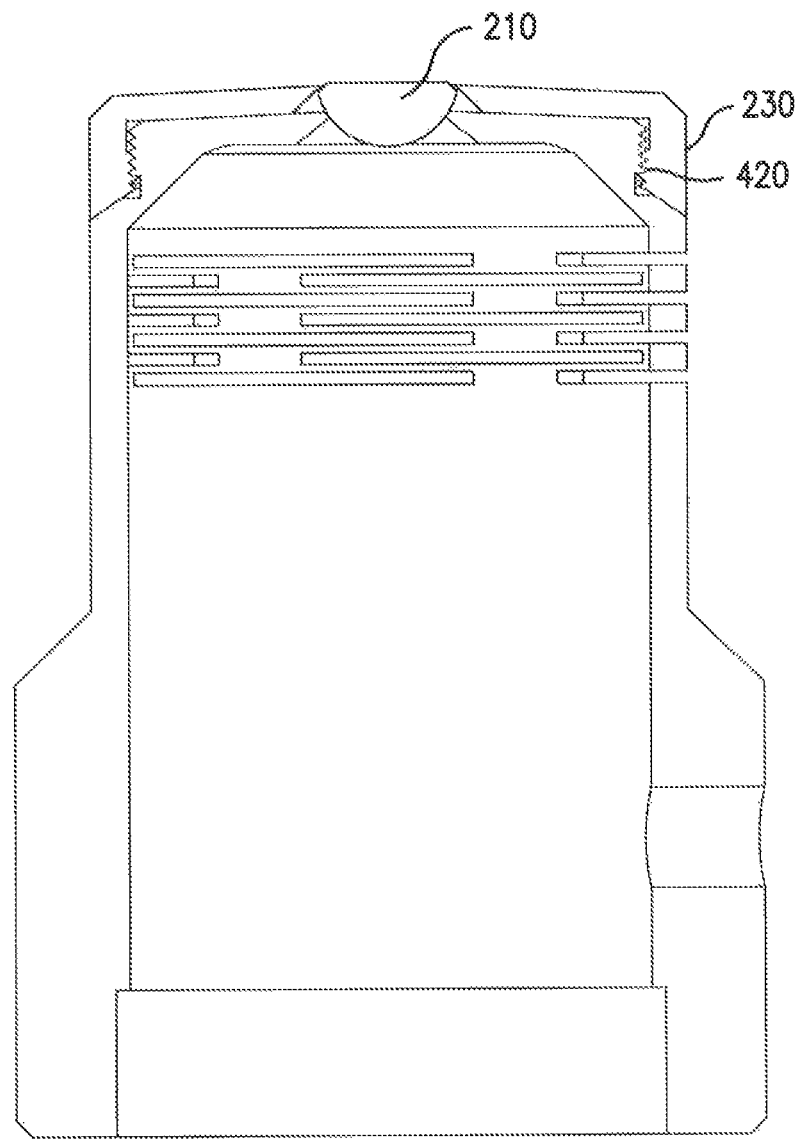
Figure 3I:
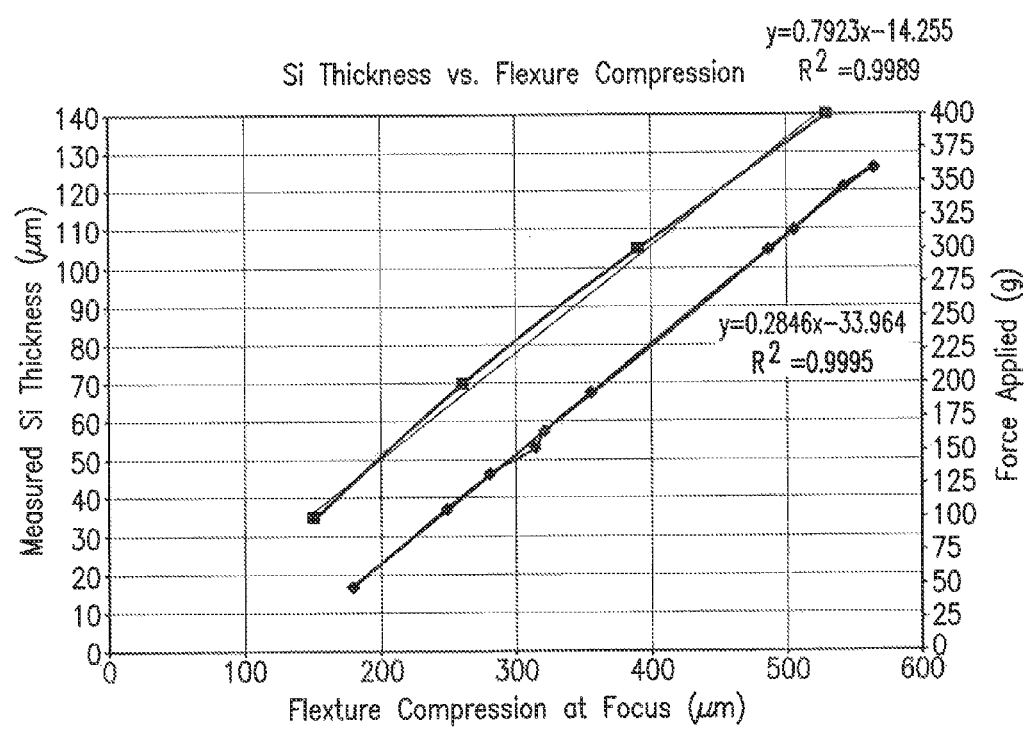
FIGS. 3i, 3j illustrate results obtained for different housing designs of these teachings.
Figure 3J:
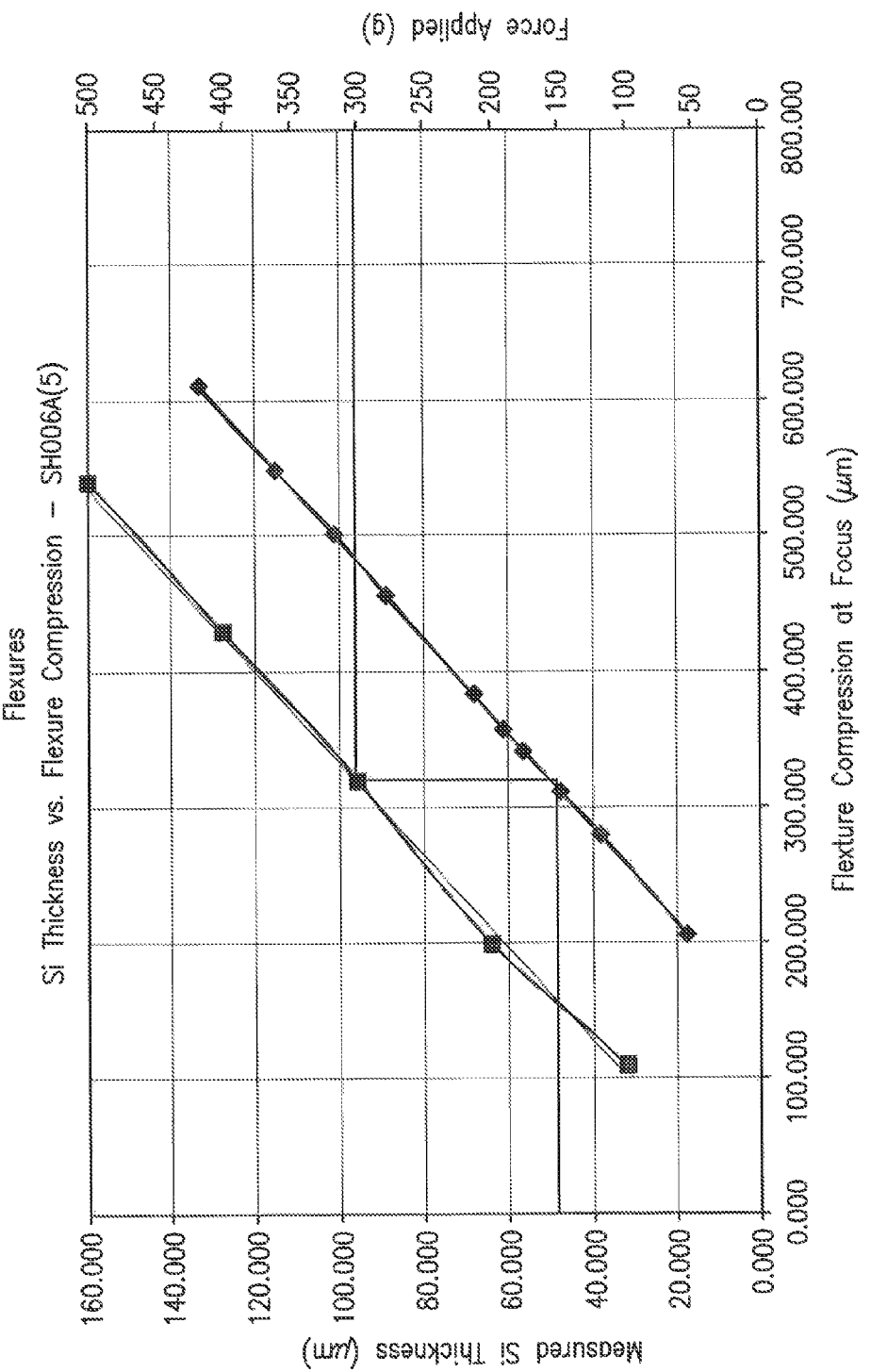

FIGS. 3e-3h depict another embodiment of the system of these teachings. Referring to FIG. 3e, the housing 130 has threads 410 on a section of the outside of the housing 130. The retaining component 230 has threads 420 on a section of the interior of the retaining component 230. The threads 410 and 420 are designed so that the retaining component 230 can be threaded onto the housing 130. In this embodiment threading is the attachment design.

Although in some embodiments, the anti-contamination component is disposed on the top surface, embodiments for the attachment of the anti-contamination component to the housing, similar to those shown in FIGS. 3e-3h ( the anti-contamination component not being shown in FIGS. 3e-3h), are also within the scope of these teachings.

Not only does the flexure design of these teachings allow for a constant variation of force with respect to the number of flexures added to the SIL objective housing, the flexures allow for a variation of force within the limits of the desired Strehl ratio, which is a measure of imaging performance. This gives the SIL the ability to image a wide variety of silicon thicknesses that will not distort the silicon substrate itself. The Strehl Ratio is defined as the Intensity of an on-axis aberration divided by the Intensity of a perfect image. This ratio can be determined from the zero frequency component of the Fourier transform as shown below.

$$\exp(-2\pi i(v_x s + v_y y)) = 1$$

$$S = \frac{1}{\pi^2} \left| \int_0^{2\pi} \int_0^1 \exp(2\pi i \Delta W(\rho, \theta)) \rho \, d\rho \, d\theta \right|^2$$

where $\Delta W$ is the wavefront aberration with respect to the reference sphere for diffraction focus in $\lambda$.

One aspect of SIL imaging which must be carefully considered is the SIL lens to DUT interface. In order to achieve good evanescent coupling these two surfaces must mate with a maximum interspatial distance, $\delta_z$, of $$\delta_z = \frac{\lambda/2\pi}{\sqrt{n^2 \sin^2 \theta - 1}}$$

This requires the DUT surface to be properly prepared as well as the optical axis of the SIL lens to be perpendicular to the object plane. In conventional commercial technology this alignment is obtained through the use of a Tip-Tilt table to adjust the DUT with respect to the SIL optical axis. This table must have the ability to rotate in various angles (tip and tilt) in order to align the optical axis of the SIL lens perpendicular to the DUT. The current teachings eliminate this need.

In the design of the present teachings, a "free floating" bearing design for the SIL lens is implemented in order to adjust for this needed alignment (FIGS. 5a-5g). Since the SIL lens is constructed from at least a portion of a hemi-spherical silicon ball, the sphere's radius is used to construct a tangential bearing seat for the SIL lens to rest in. This bearing seat allows the SILs' instantaneous center of rotation to be at the center of curvature of the SIL lens itself. The instantaneous center of rotation is described as the point of rotation about the center of curvature without inducing a decentration of object to image mapping. This will allow the SIL to rotate about its tangential lines and effectively mate up with the DUT, keeping the optical axis of the SIL lens substantially perpendicular to the object plane. In other words, the tangential lines placed on the SIL provide a decentration of object to image mapping to zero. Since the present teachings rely on perfect object to image mapping, the instantaneous center is placed substantially at the focused marginal rays of the microscope backing objective. Given the angular freedom desired by design, the retaining ring will ensure that all marginal rays from the objective lens will pass through the SIL lens without the unnecessary stopping down of needed throughput, as well as the geometrical allowable angle in which all rays will still pass through the planar side of the SIL lens. Meaning, the marginal rays of the backing objective will pass through both the planar and hemispherical surfaces of the SIL lens.

Another advantage of the bearing surface (also referred to as the solid immersion lens receiving surface), which the present teachings utilize, is that substantially a single line contact between the lens and housing may be formed. In the embodiments in which there is only a single line contact between the solid immersion lens and the housing, this line contact interface will maximize the thermal impedance between the SIL and the backing objective, in addition to allowing the full NA of the backing objective to transmit through the SIL lens. Thermal isolation can also be attained through material selection of the solid immersion lens receiving surface.

In one embodiment, the SIL lens utilizes a silicon spherical ball polished such that the distortions of the surface will be negligible to the image produced by the SIL lens and backing objective. By utilizing a surface quality that will have negligible aberration in the resulting image and an anti-reflection (AR) coating made of some suitable material such as a polymer consisting of titanium-oxide, the full numerical aperture and or resolution of the optic can be realized. The SIL material coupled with the hard AR coating creates a durable surface for use in the high precision bearing surface.

Figure 5G:
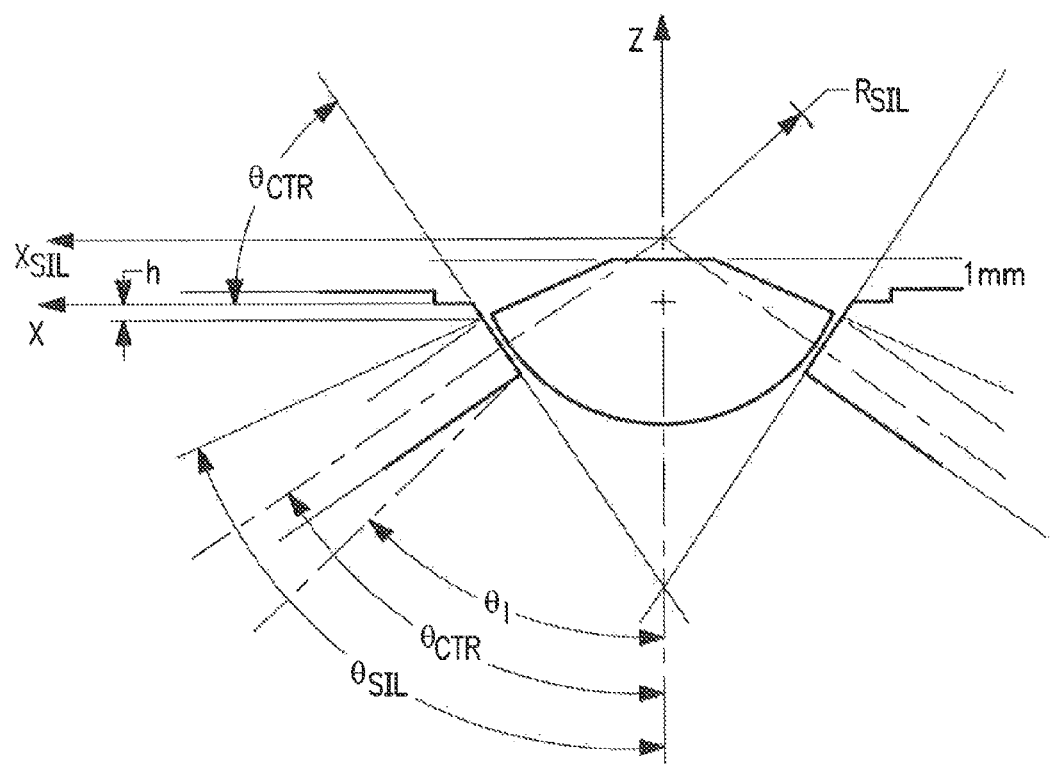

In another instance, shown in FIGS. 5e, 5f, and 5g, the solid immersion lens 210 is a truncated section of the hemisphere. In one embodiment, the truncated section has a predetermined angular width, the hemisphere being truncated at a predetermined distance away from the center of the hemisphere, the predetermined distance and the angular width being determined in order to obtain a predetermined numerical aperture and a predetermined possible angular rotation.

In another embodiment, the truncated section is obtained by the intersection of the hemisphere, the hemisphere constituting a first hemisphere, with an angular section of a second hemisphere; the second hemisphere having a radius larger than the radius of the first hemisphere. It should be noted that the center of the first hemisphere at the center of the second hemisphere do not have to be collocated. The two above embodiments may appear, in some instances, substantially the same.

In the embodiments shown in FIGS. 5a-5g, the solid immersion lens can rotate with respect to the solid immersion lens receiving surface. The relationships between the Numerical Aperture, the angular extent of the SIL rotation, the silicon thickness (the predetermined distance away from the center of the hemisphere), the extent of the bearing land (the solid immersion lens receiving surface in the housing), and other parameters have been determined. This allows the self-leveling aspect of the SIL Housing to be substantially optimized. FIG. 5g depicts a number of the parameters:

$R_{sil}$: radius of the SIL lens h: "headroom", defines additional material on the upper bearing land $t_{Si}$: backside Si thickness (or cover slip thickness)—not labeled $\theta_{sil}$: angle of the SIL cone (the term "angular width," as used herein, refers to 2 $\theta_{sil}$)

$\theta_{ctr}$: contact angle, angle at the center of the travel, point of the SIL on the land $\theta_i$: angle of the maximum marginal ray (this sets the achievable Numerical Aperture, NA).

The numerical aperture versus angular travel relationship can be obtained for a selected radius and angular width. The shape of the solid immersion lens can be selected to ensure the substantially best opto-mechanical performance.

Perfect wavefronts and rays are described by the Collinear Transformation. For this reason, wavefronts are spherical and the rays that are associated with them are considered homocentric. In other words, a perfect lens wants to produce a spherical wavefront in its exit pupil, where its center of curvature falls at the origin, $(x_o, y_o, z_o)$. If there is any deviation from this ideal, a deformation from the ideal spherical wavefront will occur. This wavefront deformation implies that there is an optical path difference between the reference wavefront and actual.

More specifically, for axially symmetric systems, the wavefront deformation is typically quadratic or quartic with respect to the aperture of the system. Furthermore, as for off-axis symmetry, or plane symmetry, the wavefront deformation has an axial, plane, or double plane symmetry, i.e. coma, astigmatism, field curvature, and distortion. In current IC failure analysis, an aberration-free image is of great importance such that the full resolution of the objective can be obtained.

The present teachings take into account the various aberrations and optimized the SIL lens characteristics to reduce their effects. Specifically, the effects of chromatic aberration with respect the SIL radius were optimized to minimize the axial and lateral chromatic aberrations. Axial chromatic aberration, as described by third order aberration theory, is defined:

$$\partial_\lambda W_{020} = \frac{1}{2}\sum_i \frac{\phi_i y_i^2}{v_i}$$

Similarly, lateral chromatic aberration, as described by third order aberration theory, is defined as:

$$\partial_\lambda W_{111} = \sum_i \frac{\phi_i \bar{y}_i y_i}{v_i}.$$

By taking into account the chromatic component of the SIL lens, which will appear as blur when viewing an emission source, the SIL lens radii was optimized such that chromatic blur is minimal with respect to the working distance of the objective.

As a result of the natural hemispherical shape of the presented SIL lens used, although the SIL flexure housing can be used with any form of SIL lens, astigmatism is one of the main contributing aberrations that will affect image resolution and quality. Given the transverse ray aberration equation, $$w'\epsilon = 2[(W_{222}+W_{220})H^2 + \Delta W_{20}]\rho \cos\phi$$
$$\vec{h} + 2[W_{220}H^2 + \Delta W_{20}]\rho \sin\phi \vec{i},$$

because this form of aberration is non-axially symmetric, the amount of astigmatism that will be produced with respect to the imaging sensor has different wavefan curvatures in the xp and yp planes, is quadratic field dependent in nature, and varies linearly with respect to the power of the lens. In view of the quadratic field dependence of the astigmatism, the object/image field relationship within the imaging system has to be considered in determining the radius of the solid immersion lens.

Figure 6:
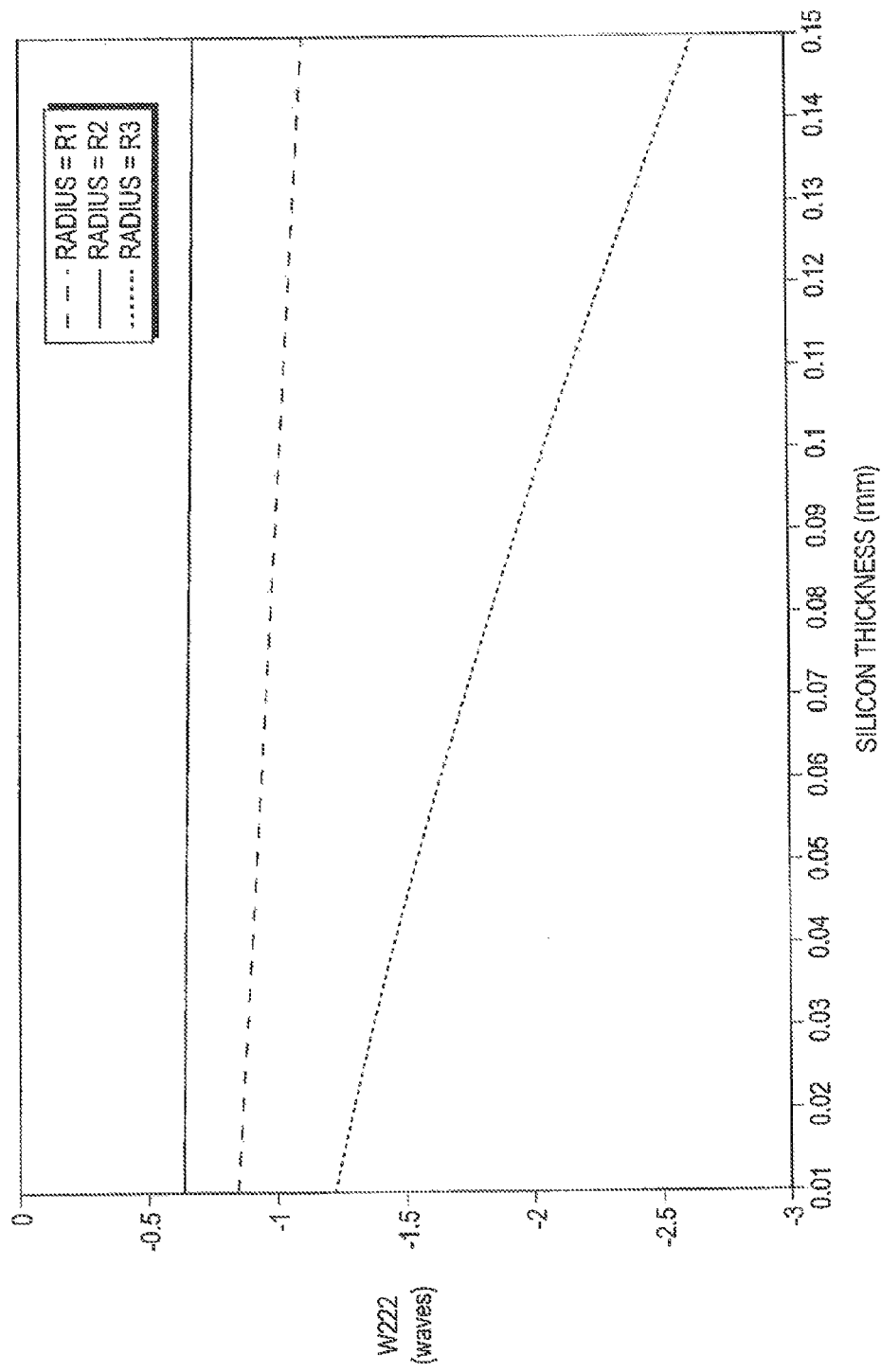
FIG. 6 shows a graph of the $W_{222}$ wavefront aberration coefficient versus silicon thickness for several solid immersion lens radii.
Figure 7:
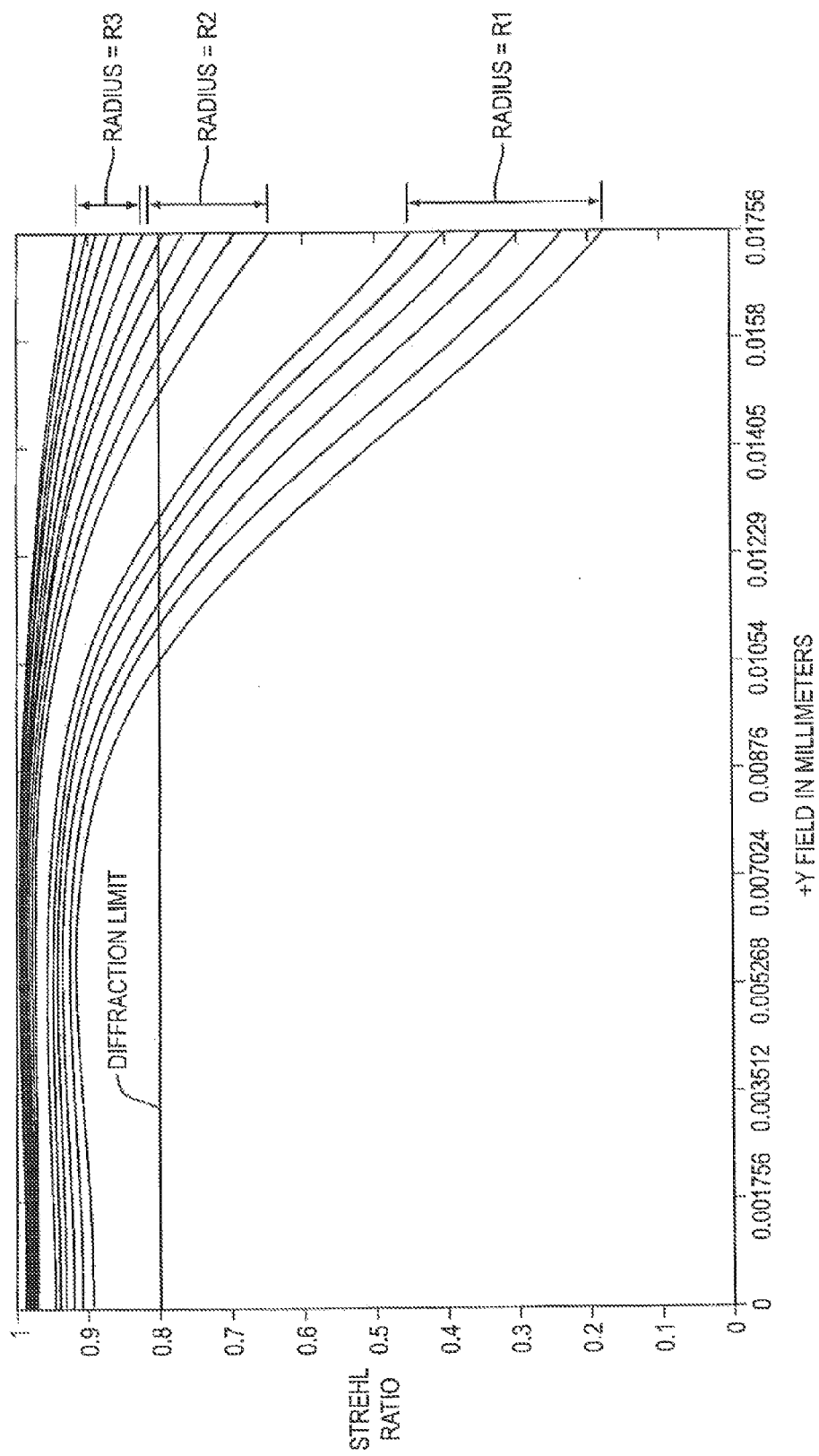
FIG. 7 depicts the Strehl ratio as a function of the y field for a range of radii and for a range of wavelengths.

For a desired numerical aperture, a predetermined wavelength band, a predetermined field height, and a predetermined range of radius of the hemisphere used in the solid immersion lens, consideration of wavefront aberration and image quality, measured by the Strehl ratio, are used to select a radius for the solid immersion lens. FIG. 6 shows a graph of the $W_{222}$ wavefront aberration coefficient versus silicon thickness for several solid immersion lens radii. As can be seen from FIG. 6, the astigmatism is substantially flat for a range of radii. As a result, the image clarity across the full field of the detector will be substantially flat for a range of radii. FIG. 7 depicts the Strehl ratio as a function of the y field for a range of radii and for a range of wavelengths. The radius $R_1$, based on the results shown in FIG. 7, will provide a diffraction limited system for all the wavelengths of interest.

The radius is also chosen by considerations of the limits of working distance with respect to the numerical aperture. For the design shown in FIGS. 6, 7, the radius $R_1$ would be the design choice.

It should be noted that other solid immersion lens designs are within the scope of these teachings. For example, the bi-convex solid immersion lens described in WIPO International Publication Number WO 97/41556, Optical Flying Head with Solid Immersion Lens Having Based Central Surface Facing Media, published on Nov. 6, 1997 and U.S. Pat. No. 6,594,086, both of which are incorporated by reference herein in their entirety, are within the scope of these teachings.

Figure 4:
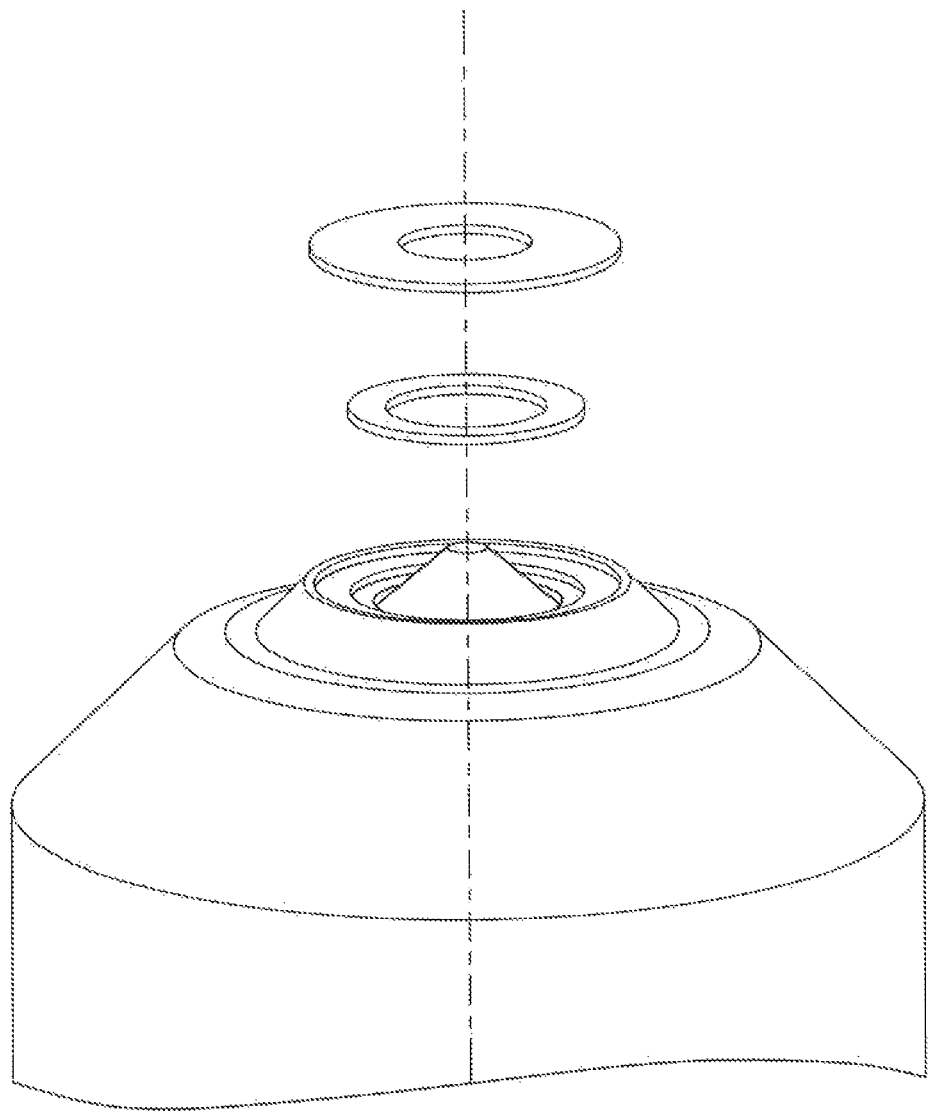
FIG. 4 shows a three-dimensional rendering of one embodiment of Housing Tip with SIL Cone on bearing Seat (receiving surface), Containment ring, and Anti-Contamination Ring (ACR) of these teachings.

Due to the mechanical design and constraints of the freedom of rotation of the SIL lens, a retaining component (a ring in the embodiment shown) is placed over the SIL lens and is subject to a restriction of angular freedom. (FIG. 4, FIGS. 5a-5b). The retaining component 230 is disposed on a top surface 220 of the housing. Although the top surface is shown as a planar surface of a given extent, it should be noted that different designs are within the scope of these teachings. The top surface can include, but is limited to, a surface in an indented area, such as a groove, where the retaining component is supported in the groove.

The retaining component 230 is operatively connected (attached) to housing by one of a variety of conventional attachment designs. In one instance, the retaining component is shrink fitted into an indentation in the housing. The mechanical tolerances between the indentation and the dimensions of the retaining component are selected so that the retaining component remains well secured through the temperature range of interest. The retaining component could be secured by adhesive, could be press fitted into an indented area, could be secured into an indented area by means of an adhesive, could be welded into it by means of electron beam welding or some other type of welding, could be attached by fasteners or any other of a variety of conventional attachment designs.

The top surface is disposed a predetermined distance away from the center 250 of the hemisphere used in the solid immersion lens 210. The top surface 220 has a substantially central opening. A characteristic dimension of the substantially central opening is selected to allow placement of the solid immersion lens 210 onto the receiving surface 260. The retaining component has a substantially central retaining opening; an area of the substantially central retaining opening being smaller than an area of the substantially central opening in the top surface 220. The retaining component is sized to allow rotation of the solid immersion lens with respect to the receiving surface and such that the solid immersion lens is retained in the housing.

In a commercial and/or research environment, the SIL lens of these teachings, including the SIL housing and objective, can be placed in any orientation, as long as the sample is placed roughly perpendicular and within the angular constraints of the SIL lens and SIL holder. The retaining ring also protects the edges of a given SIL lens design from moving further than the allowable NA of the objective.

In one instance, a highly flexible anti-contamination component (a ring in the embodiment shown) (ACR) is placed on top of the retaining component (ring). As mentioned above, the ACR limits the amount of environmental contamination from settling on the bearing seat. (In embodiments where the retaining component is not used, the ACR is placed on the top surface.) It also allows the SIL cone-shape or any similar characteristic to be held concentric with respect to the objective by applying a very small force to hold the SIL against the receiving surface of the housing. This will allow the entire SIL assembly to be used in any orientation, as long as the sample is placed within a perpendicular field of view of the SIL lens itself. As shown in FIGS. 5e and 5f, the anti-contamination component 270 extends beyond the retaining component 230 and is in contact with the solid immersion lens 210; the anti-contamination component 270 substantially preventing contamination from entering a region between the solid immersion lens and the receiving surface. 260. In one embodiment, the anti-contamination component 270 includes a moldable polymer material; the moldable polymer material having a stiffness selected to substantially allow rotation of the solid immersion lens 210 with respect to the receiving surface 260. In one instance, the moldable polymer material has a glass transition temperature selected to allow operation over a predetermined range of temperatures. In addition, the moldable polymer material has a low thermal conductivity and low thermal mass.

The solid immersion lens 210 should be able to image the device under test when the device under test is at a temperature in a predetermined range of temperatures (in one exemplary embodiment, not a limitation of these teachings, the range is 0° C. to 100° C.). In one embodiment, the solid immersion lens 210 is substantially thoroughly isolated from the backing objective that images onto the detector. In one instance, the thermal isolation is obtained by a thermal isolating layer 280 contacting at least a portion of the receiving surface 260. In one instance, the thermal isolating layer 280 includes the receiving (bearing) surface 260 (FIG. 5f). The flexures also provide thermal isolation of the Backing Objective from heat flux conducted to and from the SIL. The heat flow and temperatures can be determined by conventional means.

The present teachings isolate the backing objective from the SIL/DUT, because the thermal mass is very low and thermal conductivity of silicon is very high. Therefore, the SIL achieves a stable temperature quickly while also ensuring isolation of the Backing objective due to high thermal impedance paths designed at the SIL/Holder interface (SIL receiving surface) and due to the design of the flexures, which force the heat flux to take a very long and circuitous path.

In another embodiment, shown in FIG. 3a, when the housing in the system has another end disposed a distance away from the one end; and an outer surface extending from the one end to the other end, the outer surface 135 has a port 120 (also referred to as the purge port) connecting an exterior of the outer surface 135 to a channel disposed interior to the surface. A cleaning gas introduced through the port is able to propagate through the channel in order to remove condensation from in the solid immersion lens and other optical components. The cleaning gas (for example, but not a limitation of these teachings, clean dry air or N$_2$) also has an effect on the thermal isolation. The convective heat flow can be included in the determination of heat flow and temperatures.

Referring again to FIG. 1, the inspection system shown therein includes a number of lens mechanisms 17, each lens mechanism 17, in one embodiment being a lens mechanism such as those shown in FIGS. 3a-3h or in FIGS. 5a-5g. The selectable lens mechanism 15 can be, in one embodiment, a turret or, in another embodiment, a number of slidable lens mechanisms. Embodiments in which only a portion of the lens mechanism, such as the assembly holding the solid immersion lens, is selectable also within the scope of these teachings. The lens mechanism 17, including in one embodiment a solid immersion lens and an objective lens (as in FIGS. 3c-3h), the objective lens receiving electromagnetic radiation from the solid immersion lens, provides electromagnetic radiation to a detector system 20, a cooled IR camera in the embodiment shown therein. Although the above described embodiments receive electromagnetic radiation, it should be noted that embodiments in which electromagnetic radiation is provided by an illuminator and at least some of the optical components provide electromagnetic radiation are also within the scope of these teachings. The lens mechanism and, in one instance, other instances also being within the scope of these teachings, the detector are operatively connected to a multi-axis stage 30. The multi-axis stage could be in one instance a stage (hereinafter referred to as "an X-Y stage"), for motion substantially horizontal with respect to the device under test 12 or for two-dimensional motion substantially lateral to a chief ray of the objective lens subsystem, and another stage (hereinafter referred to as a "Z stage"), for enabling motion substantially vertical to the device under test or substantially orthogonal to the chief ray. A stage controller 35 provides the signals to enable motion of the X-Y stage (X-Y stage controller), and in one embodiment, the Z stage (Z stage controller) will. The stage controller 35 can be a conventional controller. Embodiments in which the control of the Z stage is performed by the optics controller 45 are also within the scope of these teachings. The optics controller 45 provides signals to select one of the lens mechanism 17 from the selectable lens mechanisms 15. A camera controller 40 controls the operation of the detector 20 (cooled IR camera in the embodiment shown). The computer 50 has one or more processors and computer usable media operatively connected to the one or more processors, the computer usable media having computer readable code that causes the processor to perform desired actions. The computer 50 provides signals to the controllers 35, 40, 45 in order to control the motion of the X-Y stage and the Z stage.

Figure 8:
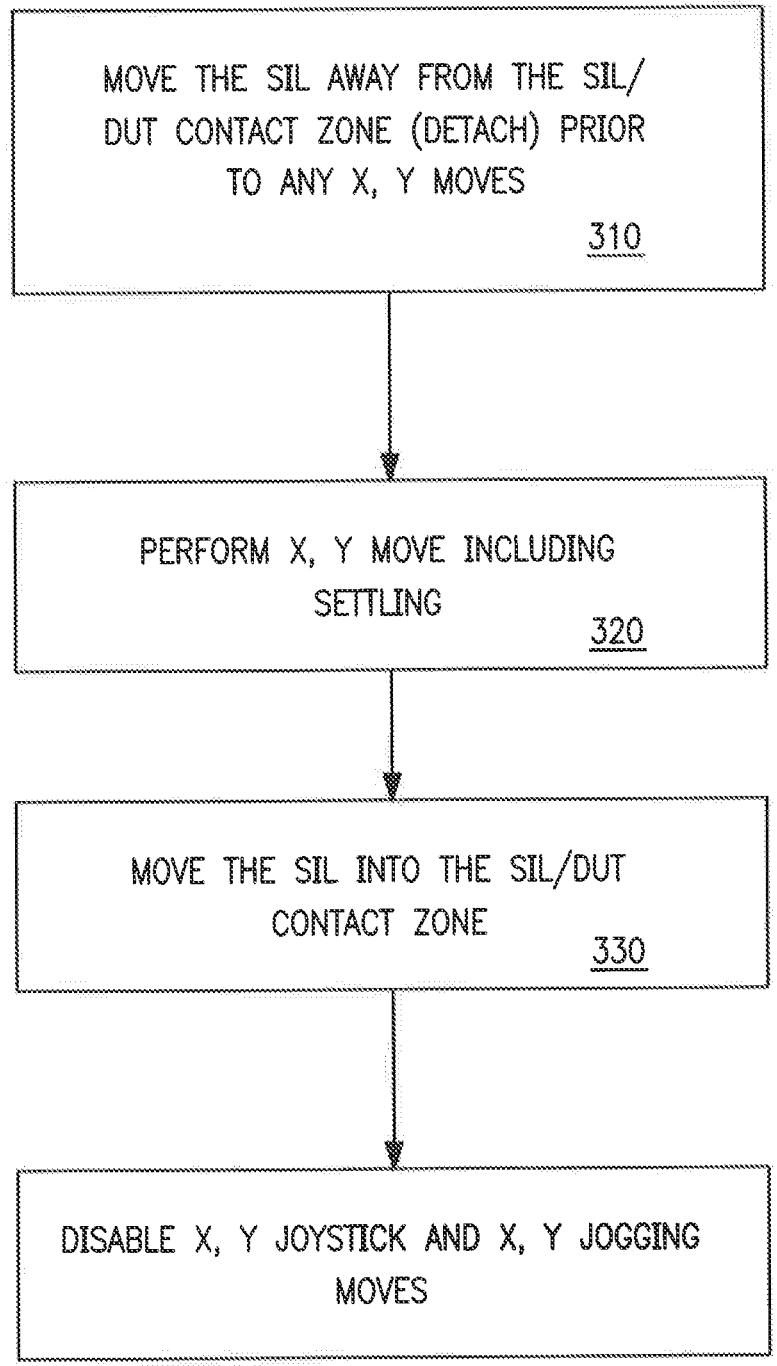
FIGS. 8-10 are flowchart representations of embodiments of the computer readable code for controlling the XY and Z motion.

FIG. 8 shows a flowchart of instructions that, in one embodiment, are implemented in computer readable code to cause the processor inside the computer 50 to (a) provide signals to the stage controller 35 to cause the solid immersion lens, prior to any X-Y moves, to move away from a predetermined solid immersion lens/device under test contact zone (step 310, FIG. 8), (b) provides signal to the stage controller 35 to perform a desired X-Y move (step 320, FIG. 8), (c) provide signals to the stage controller to move the solid immersion lens to a new solid immersion lens/device under test contact zone (step 330, FIG. 8) and (d) disable X-Y moves. This embodiment of the computer readable code prevents sliding of the solid immersion lens across the surface of the device under test, thereby preventing damage to either or both.

Figure 9:
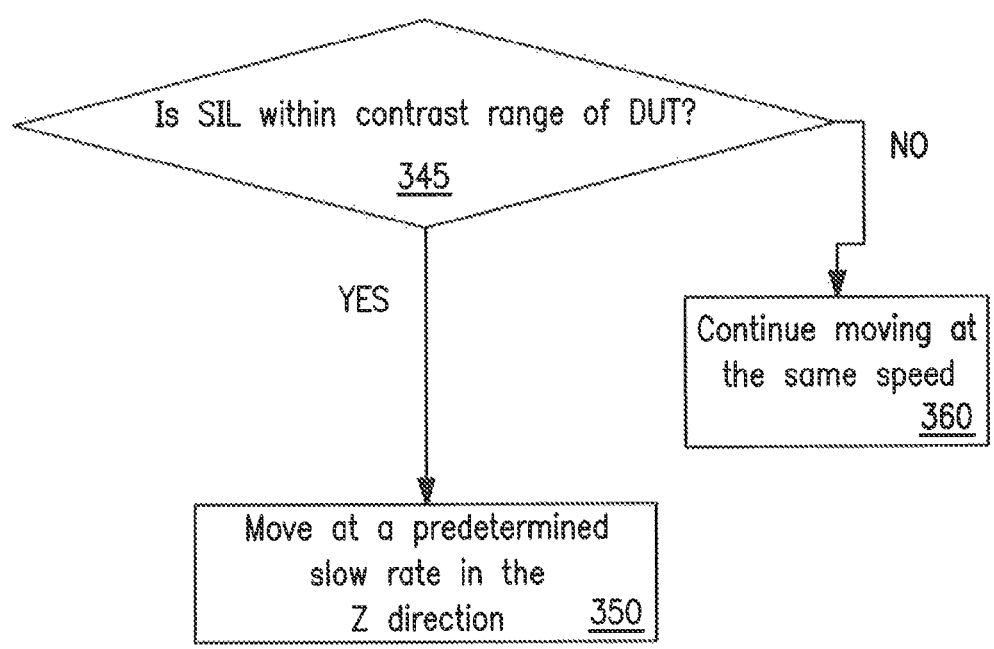

FIG. 9 shows a flowchart of another embodiment of the computer readable code for controlling the stage controller 35. Referring to FIG. 9, the computer readable code causes the processor in the computer 50 to (a) determine whether the solid immersion lens is within a predetermined contact range of the device under test (step 345, FIG. 9), (b) if the solid immersion lens is within the contact range of the device under test, provides signals to the stage controller 35 to cause motion of the solid immersion lens at a predetermined slow rate in the direction substantially perpendicular to the device under test (step 350, FIG. 9). If the solid immersion lens is not within contact range of the device under test, the solid immersion lens continues to move at the same speed it was moving (step 360, FIG. 9). This embodiment of the computer readable code enables repeatable soft landing and soft detaching of the solid immersion lens.

Figure 10:
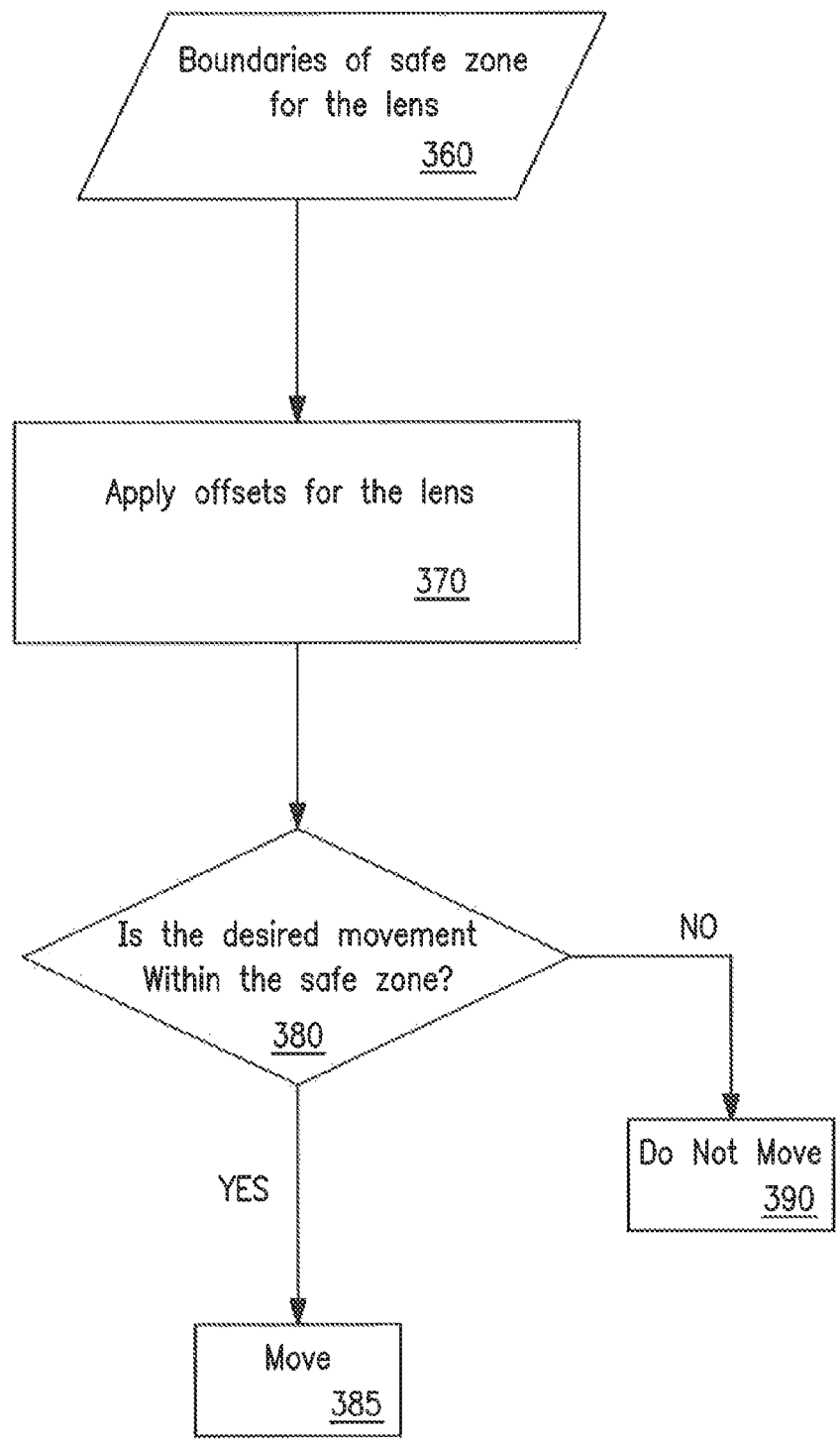
Figure 11A:
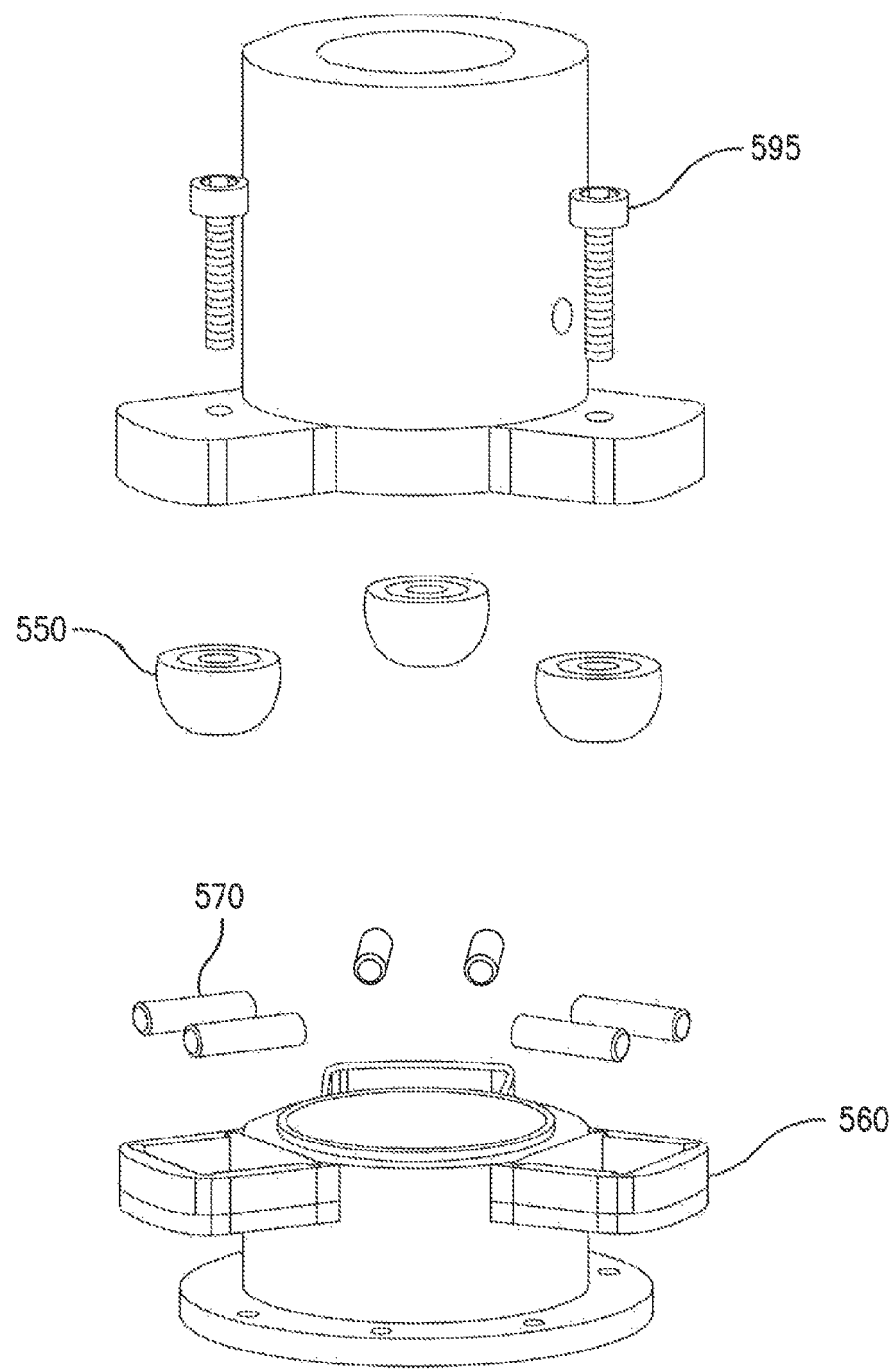
FIGS. 11a-11d are graphical representations of an embodiment of the lens mount of these teachings.
Figure 11B:
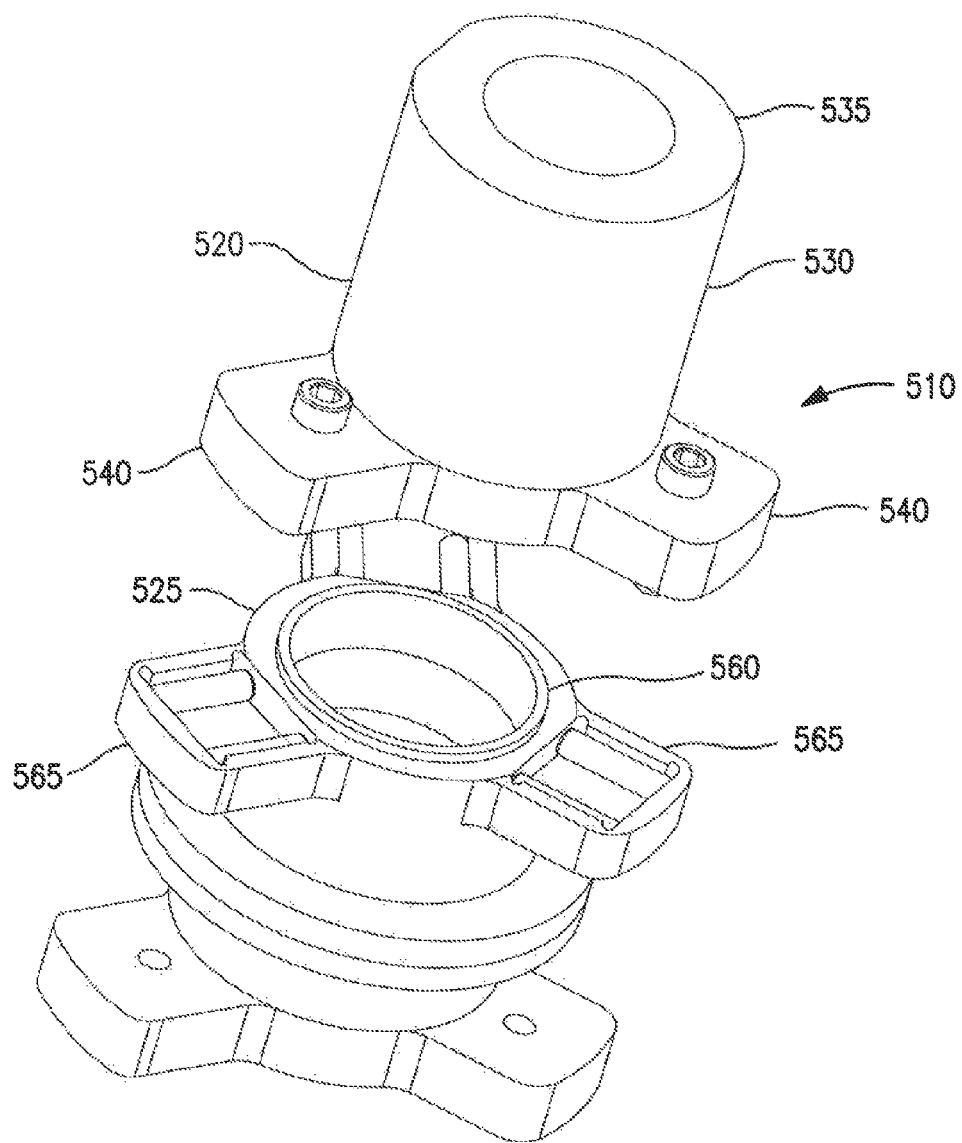
Figure 11C:
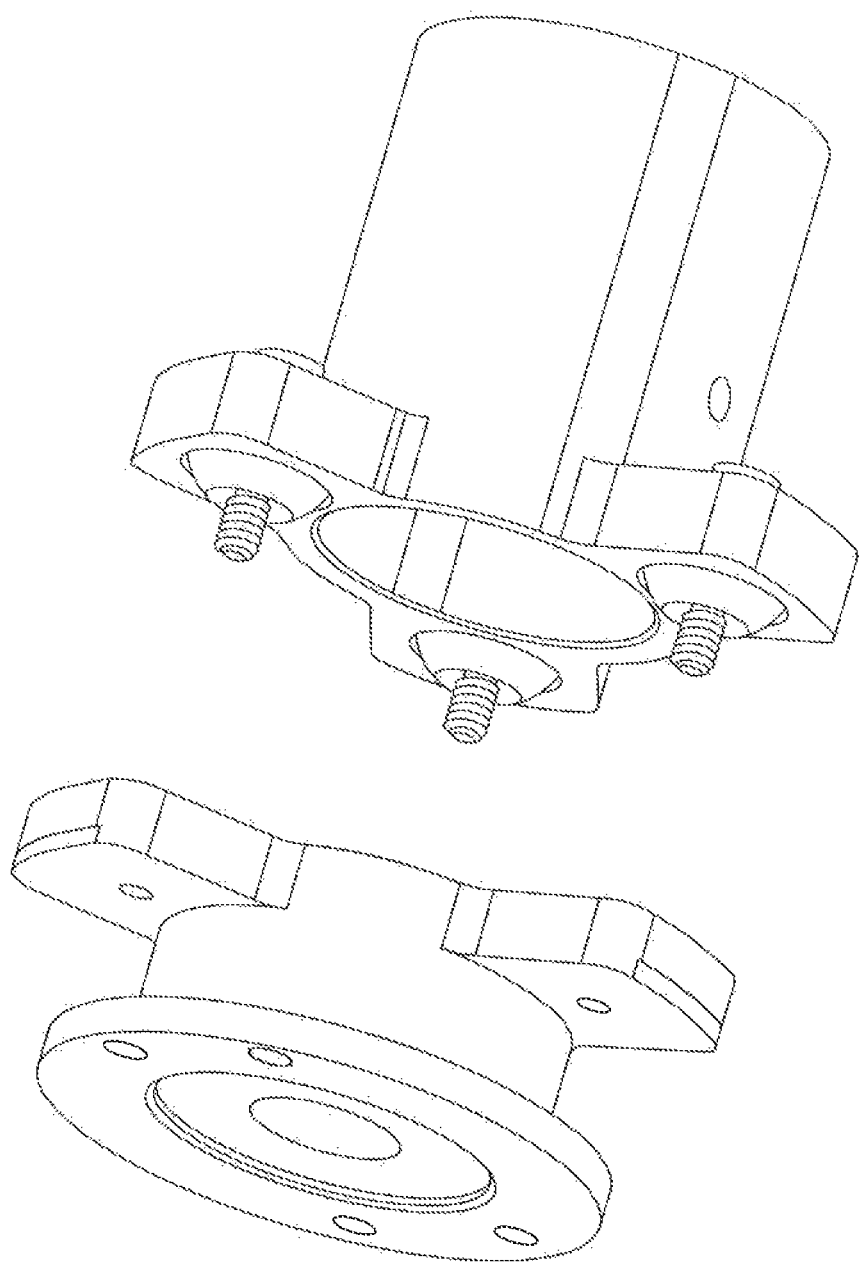
Figure 11D:
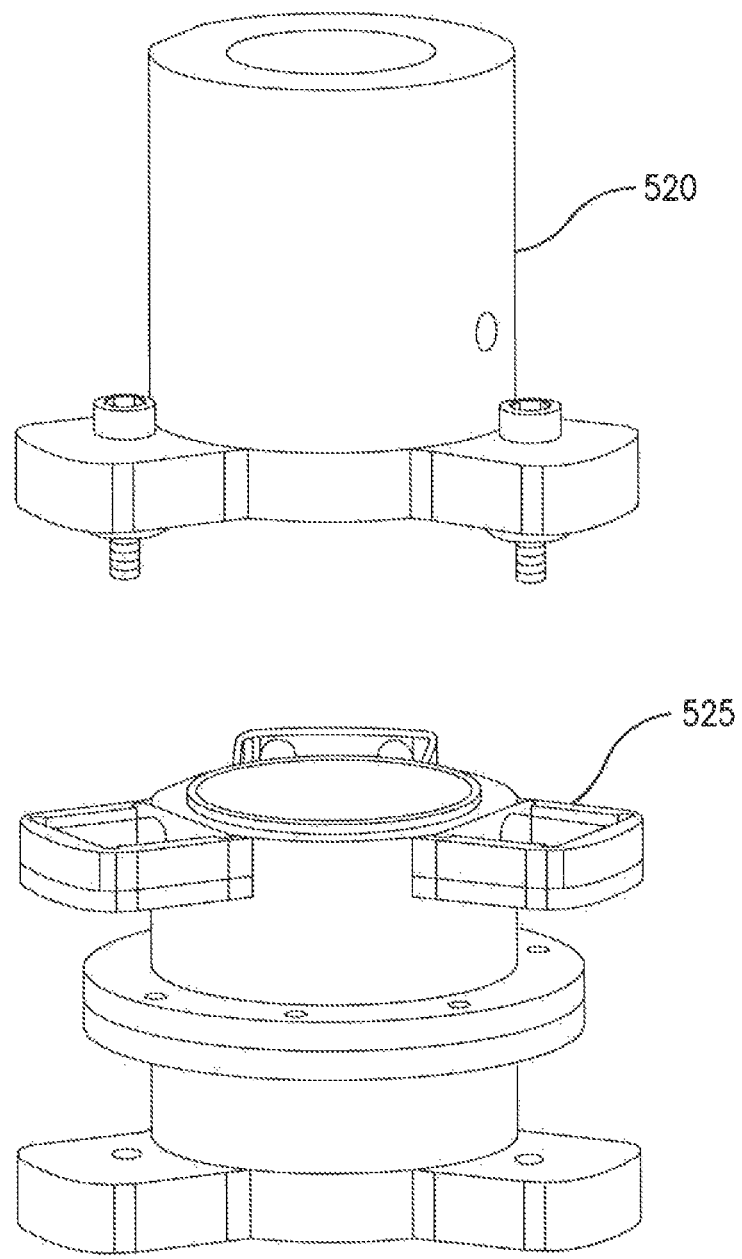

A flowchart of still another embodiment of the computer readable code for controlling the XY and Z motion is shown in FIG. 10. Referring to FIG. 10, the boundaries of the safe zone are obtained using a lower magnification lens (step 360, FIG. 10). The boundaries are adjusted based on the characteristics of each lens, such as working distance, etc. An offset is applied to the safe zone for each lens (step 370, FIG. 10). The remaining flowchart shown in FIG. 10 can be implemented in computer readable code that causes the processor in the computer 50 to execute the tasks. The offset can be applied by the computer in one instance. The computer readable code causes the processor to determine whether a desired movement is within the safe zone (step 380, FIG. 10). If the movement is within the safe zone, signals are provided to the stage controller 35 that causes the solid immersion lens (or the housing) to move (step 385, FIG. 10). If the desired movement is not within the safe zone, then the stage does not move the solid immersion lens, or the housing (the X-Y-Z motions are disabled) (step 390, FIG. 10). This embodiment of the computer readable code prevents undesirable collisions that can result in damage to hardware. One additional benefit is that the convenience of driving the stage while the software accounts for keeping the optics with in the area of interest on the device under test. This convenience is valid for SIL and air-based objective lenses.

In other embodiments, the computer readable code can cause the processor to provide signals to the stage controller 35 in order to move the solid immersion lens in and out of near contact with the device under test, so that the solid immersion lens adjusts its angle by rotating with respect to the bearing seat. The computer readable code can provide a predetermined pattern of motion of the solid immersion lens in and out of near contact with the device under test.

In one instance, the inspection system also includes a crash protection switch that ensures that the SIL cannot over travel. The crash protection switch, which, in one embodiment, can be incorporated into the stage 30, is, in one embodiment, a hardware implementation of the computer readable code implementation of the flowchart of FIG. 10. The crash protection switch, in one embodiment, can be similar to switches used to prevent a carriage from going back too far (see for example, Printer Carriage Motor Control, San Jose University, Fall 2000, which is incorporated by reference herein in its entirety for all purposes). A number of other embodiments of the crash protection switch are also within the scope of these teachings. Included in the possible embodiments are electromechanical switches and photo-electromechanical switches which either mechanically prevent motion while also interrupting or reducing the driving source or switches that interrupt or reduce the driving source after sensing the position of the SIL. Embodiments of interrupt mechanisms can also be used as crash protection switches.

In another embodiment, the inspection system of these teachings includes a lens mount where the housing 130 is held in the lens mount. The lens mount holding the housing 130 becomes the optics arrangement 17 in FIG. 1. FIGS. 11a-11d show one embodiment of the lens mount. Referring to FIGS. 11a-11d, the lens mount 510 includes a lens mount first section 520 and a lens mount second section 525. The lens mount first section 520 includes a hollow mounting component 530 having a substantially central channel 535. Although in the embodiment shown the hollow mounting component is a hollow cylinder, it should be noted that these teachings are not limited to that embodiment. A number of subcomponents 540 are disposed around and protrude from a periphery of the hollow mounting component 530. Each subcomponents 540 is operatively attached to the hollow mounting component 530. Although in the embodiment shown the subcomponents 540 are integral to the hollow mounting component 530, these teachings are not limited to only that embodiment. Each subcomponents has an opening where the opening is sized to receive a fastener. In the embodiment shown the fastener is a captive screw. It should be noted that these teachings are not limited only to that embodiment. The lower surface of each subcomponents is dimensioned and configured to receive a receiving component, the receiving component having an opening through which the fastener can be inserted. In the embodiment shown the receiving component is a truncated sphere or ball. However these teachings are not limited only to that embodiment.

The lens mount second section 525 includes a second section hollow component 560 and a number of second section subcomponent 565 that are disposed around and protrude from the periphery of the second section hollow component 560. Each second section subcomponent 565 is operatively attached to the second section hollow component 560. Each second section subcomponent has an opening on the surface facing the subcomponents in the first section, the opening being sized to receive a parcentricity preserving component. In the embodiment shown in FIGS. 11a-11d, the parcentricity preserving component includes two centering pins 570. Each centering pin 570 from each pair of centering pins 570 is disposed at opposite sides of the opening on the surface of each second section subcomponent 565.

A line through the center of the space between the two centering pins 570 intersects a chief ray of the objective lens 290. In one instance, the line through the center of the space between the two centering pins 570 is orthogonal to the chief Ray of the objective lens 290. In this embodiment, parcentricity is substantially preserved since, if the assembly undergoes a change in temperature, the center of the objective lens does not substantially change.

When SIL/objective lens combinations are replaced from one test to another and subsequently swapped back in, the lens mount of these teachings can substantially maintain parcentricity and parfocality. In order to do so, upon first use of a SIL/objective lens combination, predetermined centering quantities, such as distances between lenses and any encoding quantities (for example, a lens to encoder index Mark) are recorded, the lens combination is brought into focus and the focusing quantities (such as the settings for movement along the chief Ray or z-axis encoder settings) are recorded. When the SIL/objective lens combination is swapped back in, those settings are used to position the lenses and the focusing settings are used to bring their length back into focus. The characteristics of the lens mount of these teachings enables this to occur in a repeatable fashion and substantially preserves parcentricity and parfocality.

The embodiments of the inspection system of these teachings in which the lens mount is used also have the other components shown in FIG. 1. The computer 50, which provides signals to control the stage and other components, has one or more processors and one or more computer readable media.

Common forms of computer-readable media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other memory chip or cartridge, or any other non-transitory medium from which a computer can read. However, as stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended claims.

What is claimed is:

1. An optics arrangement for obtaining measurements, the optics arrangement comprising:
a solid immersion lens (SIL), said solid immersion lens being at least a portion of a hemisphere;
a housing, said housing comprising: one end, said solid immersion lens being mounted on said one end; said one end comprising:
a solid immersion lens receiving surface; said solid immersion lens receiving surface being sized to receive said solid immersion lens and configured to provide for solid immersion lens rotation with respect to said solid immersion lens receiving surface; an instantaneous center of rotation of the solid immersion lens being at a center of curvature of the solid immersion lens.

2. The optics arrangement of claim 1 further comprising:
a retaining component operatively connected to said housing; said retaining component having a substantially central retaining opening; an area of said substantially central retaining opening being smaller than an area of a substantially central opening; said retaining component being sized to allow rotation of said solid immersion lens with respect to said receiving surface; said solid immersion lens being retained in the housing.

3. The optics arrangement of claim 1 wherein said housing further comprises: another end disposed a distance away from said one end; and an outer surface extending from said one end to said another end; and wherein said outer surface comprises a plurality of flexures; said plurality of flexures being proximal to said receiving surface; a number of said plurality of flexures and dimensional characteristics of said plurality of flexures being selected such that a force exerted by the said solid immersion lens on a device under test (DUT) does not substantially distort or damage the device.

4. The optics arrangement of claim 3 further comprising a thermal isolating layer contacting at least a portion of said receiving surface; the thermal isolating layer and the housing constituting a thermal path.

5. The optics arrangement of claim 4 wherein said plurality of flexures provides an isolated path for thermal flow.

6. The optics arrangement of claim 4 wherein said thermal isolating layer comprises said receiving surface.

7. The optics arrangement of claim 4 wherein said thermal isolating layer comprises a material having high thermal resistance.

8. The optics arrangement of claim 2 further comprising: an anti-contamination component disposed over said retaining component; said anti-contamination component extending beyond said retaining component and in contact with said solid immersion lens; said anti-contamination component substantially preventing contamination from entering a region between said solid immersion lens and said receiving surface.

9. The optics arrangement of claim 1 further comprising a component, said component selected from at least one of a retaining component or an anti-contamination component, said component providing sufficient force to hold the SIL to the solid immersion lens receiving surface such that the SIL can be operated in substantially any orientation.

10. The optics arrangement of claim 8 wherein said anti-contamination component comprises a moldable polymer material; said moldable polymer material having a stiffness selected to substantially allow rotation of said solid immersion lens with respect to said receiving surface.

11. The optics arrangement of claim 8 wherein said anti-contamination component provides a small angular restoring force to ensure that the SIL is presented to a device under test (DUT) within a substantially nominal range of contact angles.

12. The optics arrangement of claim 10 wherein said moldable polymer material has a glass transition temperature selected to allow operation over a predetermined range of temperatures.

13. The optics arrangement of claim 10 wherein said moldable polymer material has predetermined thermal properties selected to allow operation over a predetermined range of temperatures.

14. The optics arrangement of claim 13 wherein said predetermined thermal properties comprise low thermal conductivity.

15. The optics arrangement of claim 8 wherein said anti-contamination component is utilized to provide sufficient force to hold the SIL to the solid immersion lens receiving surface such that the SIL can be operated in substantially any orientation.

16. The optics arrangement of claim 1 further comprising:
an anti-contamination component operatively connected to said housing; said anti-contamination component having a substantially central anti-contamination opening; an area of said substantially central anti-contamination opening being smaller than an area of a substantially central opening; said anti-contamination component being in contact with said solid immersion lens; said anti-contamination component substantially preventing contamination from entering a region between said solid immersion lens and said receiving surface.

17. The optics arrangement of claim 16 wherein said anti-contamination component comprises a moldable polymer material; said moldable polymer material having a stiffness selected to substantially allow rotation of said solid immersion lens with respect to said receiving surface.

18. The optics arrangement of claim 16 wherein said anti-contamination component provides a small angular restoring force to ensure that the solid immersion lens is presented to a device under test within a substantially nominal range of contact angles.

19. The optics arrangement of claim 17 wherein said moldable polymer material has a glass transition temperature selected to allow operation over a predetermined range of temperatures.

20. The optics arrangement of claim 1 wherein said housing further comprises: another end disposed a distance away from said one end; and an outer surface extending from said one end to said another end; and wherein said outer surface comprises a port connecting an exterior of said outer surface to a channel disposed interior to said outer surface; a cleaning gas introduced through said port being able to propagate through said channel in order to remove condensation from said solid immersion lens and other optical components.

21. The optics arrangement of claim 1 wherein a radius of the hemisphere in said solid immersion lens is selected so that effect of aberrations is reduced.

22. The optics arrangement of claim 21 wherein the effect of aberrations is measured by a Strehl ratio.

23. The optics arrangement of claim 1 wherein said solid immersion lens comprises a truncated section of the hemisphere; said truncated section having a predetermined angular width; said hemisphere being truncated at a predetermined distance away from a center of the hemisphere; said predetermined distance and said angular width being determined in order to obtain a predetermined numerical aperture and a predetermined possible angular rotation.

24. The optics arrangement of claim 23 wherein said truncated section is obtained by the intersection of a hemisphere, the hemisphere constituting a first hemisphere, with an angular section of a second hemisphere; the second hemisphere having a radius larger than the radius of the first hemisphere.

25. The optics arrangement of claim 1 wherein said solid immersion lens comprises a biconvex solid immersion lens.

26. A method for allowing contact/evanescent coupling between a solid immersion lens and a device under test while not exerting excessive pressure on the device under test, the method comprising the steps of: providing a self aligning solid immersion lens arrangement; said self aligning solid immersion lens arrangement configured for rotation of a solid immersion lens in order to allow contact/evanescent coupling between the solid immersion lens and the device under test; an instantaneous center of rotation of the solid immersion lens being at a center of curvature of the solid immersion lens; and providing a solid immersion lens arrangement wherein the solid immersion lens exerts a force on the device under test such that the loading on the device under test does not exceed the elastic limit of a material of the device under test.

27. An inspection system comprising:
a solid immersion lens, said solid immersion lens being at least a portion of a hemisphere; a housing, said housing comprising:
one end, said solid immersion lens being mounted on said one end;
another end disposed a distance away from said one end; and
an outer surface extending from said one to said another end; and wherein said outer surface comprises a plurality of flexures; said plurality of flexures being proximal to said one end; a number of said plurality of flexures and dimensional characteristics of said plurality of flexures being selected such that a force exerted by the said solid immersion lens on a device under test provides loading on the device under test does not exceed the elastic limit of a material of the device under test.

28. The inspection system of claim 27 further comprising: an objective lens sub-system disposed inside said housing; said objective lens sub-system being optically disposed to receive electromagnetic radiation from and provide electromagnetic radiation to said solid immersion lens; a detector sub-system optically disposed to receive electromagnetic radiation from said objective lens sub-system; an X-Y stage and a Z stage; said X-Y stage operatively connected to said housing in order to move said housing substantially along the device under test; said Z stage operatively connected to said housing in order to move said housing substantially towards the device under test; the device under test being optically disposed to provide/receive electromagnetic radiation to/from the solid immersion lens; an X-Y stage controller operatively connected to the X-Y stage in order to control movement of the X-Y stage; a Z stage controller operatively connected to the Z stage in order to control the movement of the Z stage; and one or more processors operatively connected to the X-Y stage controller and to the Z stage controller.

29. The inspection system of claim 28 further comprising; one or more computer usable media having computer readable code embodied therein, said computer readable code causing, upon execution of said computer readable code by said one or more processors, said one or more processors to: provide, prior to X-Y displacements, a signal to the Z stage controller in order to move the solid immersion lens away from a contact zone of the solid immersion lens and the device under test; provide a signal to the X-Y stage controller in order to perform X-Y displacements; provide a signal to the Z stage controller in order to move the solid immersion lens into a solid immersion lens/device under test contact zone; and disable acceptance of inputs for X-Y displacements.

30. The inspection system of claim 28 further comprising: one or more computer usable media having computer readable code embodied therein, said computer readable code causing, upon execution of said computer readable code by said one or more processors, said one or more processors to: determine whether the solid immersion lens is within contact range of the device under test; provide, if the solid immersion lens is within the contact range of the device under test, a signal to the Z stage controller in order to move the solid immersion lens at a predetermined slower rate towards or away from the device under test.

31. The inspection system of claim 28 further comprising: one or more computer usable media having computer readable code embodied therein, said computer readable code causing, upon execution of said computer readable code by said one or more processors, said one or more processors to: apply predetermined offsets to a predetermined safe zone; determine, before providing signals to the X-Y stage controller and/or the Z stage controller, whether a desired displacement is within the predetermined safe zone; and provide, if the desired displacement is within the predetermined safe zone, a signal to the X-Y stage controller and/or the Z stage controller in order to execute the desired displacement of the solid immersion lens.

32. The inspection system of claim 27 further comprising a crash protection component; said crash protection component constraining travel of the solid immersion lens in order to substantially prevent damage to the solid immersion lens, the objective lens subsystem and/or the device under test.

33. The inspection system of claim 27 wherein said one end comprises a solid immersion lens receiving surface; said solid immersion lens receiving surface being sized to receive said solid immersion lens and configured for solid immersion lens rotation with respect to said solid immersion lens receiving surface.

34. The inspection system of claim 33 further comprising a retaining component operatively connected to said housing; said retaining component having a substantially central retaining opening; an area of said substantially central retaining opening being smaller than an area of a substantially central opening; said retaining component being sized to allow rotation of said solid immersion lens with respect to said receiving surface and such that said solid immersion lens is retained in the housing.

35. The inspection system of claim 33 further comprising a thermal isolating layer contacting at least a portion of said receiving surface; the thermal isolating layer and the housing constituting a thermal path; wherein said plurality of flexures provides an isolated path for thermal flow.

36. The inspection system of claim 35 wherein said thermal isolating layer comprises said receiving surface.

37. The inspection system of claim 35 wherein at least a portion of said thermal isolating layer comprises a material having high thermal resistance.

38. The inspection system of claim 34 further comprising: an anti-contamination component disposed over said retaining component; said anti-contamination component extending beyond said retaining component and in contact with said solid immersion lens; said anti-contamination component substantially preventing contamination from entering a region between said solid immersion lens and said receiving surface.

39. The inspection system of claim 38 wherein said anti-contaminatim component comprises a moldable polymer material; said moldable polymer material having a stiffness selected to substantially allow rotation of said solid immersion lens with respect to said receiving surface.

40. The inspection system of claim 39 wherein said moldable polymer material has a glass transition temperature selected to allow operation over a predetermined range of temperatures.

41. The inspection system of claim 33 further comprising; an anti-contamination component operatively connected to said housing; said anti-contamination component having a substantially central anti-contamination opening; an area of said substantially central anti-contamination opening being smaller than an area of a substantially central opening; said anti-contamination component being substantially in contact with said solid immersion lens; said anti-contamination component substantially preventing contamination from entering a region between said solid immersion lens and said receiving surface.

42. The inspection system of claim 41 wherein said anti-contamination component comprises a moldable polymer material; said moldable polymer material having a stiffness selected to substantially allow rotation of said solid immersion lens with respect to said receiving surface.

43. The inspection system of claim 42 wherein said moldable polymer material has a glass transition temperature selected to allow operation over a predetermined range of temperatures.

44. The inspection system of claim 27 wherein said outer surface comprises a port connecting an exterior of said outer surface to a channel disposed interior to said outer surface; a cleaning gas introduced through said port being able to propagate through said channel in order to remove condensation from said solid immersion lens and other optical components.

45. The inspection system of claim 27 further comprising:
an objective lens sub-system disposed inside said housing; said objective lens sub-system being optically disposed to receive electromagnetic radiation from and provide electromagnetic radiation to said solid immersion lens; and
a lens mount; said housing being held in said lens mount; said lens mount comprising:
a lens mount first section; said lens mount first section comprising:
a hollow mounting component having a substantially central channel running throughout; said substantially central channel being sized in order to accept said housing;
a plurality of subcomponents disposed around and protruding from a periphery of said hollow mounting component; each subcomponent from said plurality of subcomponents being operatively attached to said hollow mounting component; each subcomponent having an opening, said opening being sized to receive a fastener;
a plurality of receiving components; each said subcomponent having a lower surface, said lower surface being opposite an upper surface receiving said fastener; said lower surface being sized to receive one receiving component from said plurality of receiving components; each receiving component having a receiving opening, said receiving opening being sized to receive said fastener; and
a lens mount second section comprising:
a second section hollow component comprising a plurality of second section subcomponents disposed around and protruding from a periphery of said second section hollow component; each subcomponent from said plurality of subcomponents being operatively attached to said second section hollow component; one surface of each subcomponent having an opening, said opening being sized to receive a parcentricity preserving arrangement;
each second section subcomponents having a receiving opening for receiving said fastener; each said parcentricity preserving arrangement being sized to receive one of said receiving components;
said lens mount first section and said lens mount second section being operatively connected by fasteners; said lens mount first section and said lens mount second section being sized to substantially preserve parfocality; said housing being disposed in said hollow mounting component.

46. The inspection system of claim 45 wherein said parcentricity preserving arrangement comprises: two centering pins; each one of said two centering pins being disposed at an opposite side of said opening in said each one surface; said two centering pins being disposed such that a line through a center of a space between said two centering pins intersects a chief ray of said objective lens sub-system.

47. The inspection system of claim 46 wherein said receiving component comprises a truncated section of a sphere; said parcentricity preserving arrangement being sized to receive one receiving component.

48. The inspection system of claim 45 wherein said fastener is a screw.

49. The inspection system of claim 45 further comprising: a detector sub-system optically disposed to receive electromagnetic radiation from said objective lens sub-system; an X-Y stage and a Z stage; said X-Y stage operatively connected to said lens mount in order to move said lens mount substantially along the device under test; said Z stage operatively connected to said lens mount in order to move said lens mount substantially towards the device under test; the device under test being optically disposed to provide/receive electromagnetic radiation to/from the solid immersion lens; an X-Y stage controller operatively connected to the X-Y stage in order to control movement of the X-Y stage; a Z stage controller operatively connected to the Z stage in order to control the movement of the Z stage; and one or more processors operatively connected to the X-Y stage controller and to the Z stage controller.

50. The inspection system of claim 49 further comprising; one or more computer usable media having computer readable code embodied therein, said computer readable code causing, upon execution of said computer readable code by said one or more processors, said one or more processors to: provide, prior to X-Y displacements, a signal to the Z stage controller in order to move the solid immersion lens away from a solid immersion lens/device under test contact zone; provide a signal to the X-Y stage controller in order to perform X-Y displacements; provide a signal to the Z stage controller in order to move the solid immersion lens into the solid immersion lens/device under test contact zone; and disable acceptance of inputs for X-Y displacements.

51. The inspection system of claim 49 further comprising: one or more computer usable media having computer readable code embodied therein, said computer readable code causing, upon execution of said computer readable code by said one or more processors, said one or more processors to: determine whether the solid immersion lens is within contact range of the device under test; provide, if the solid immersion lens is within the contact range of the device under test, a signal to the Z stage controller in order to move the solid immersion lens at a predetermined slower rate towards/away from the device under test.

52. The inspection system of claim 49 further comprising: one or more computer usable media having computer readable code embodied therein, said computer readable code causing, upon execution of said computer readable code by said one or more processors, said one or more processors to: apply predetermined offsets to a predetermined safe zone; determine, before providing signals to the X-Y stage controller and/or the Z stage controller, whether a desired displacement is within the predetermined safe zone; and provide, if the desired displacement is within the predetermined safe zone, a signal to the X-Y stage controller and/or the Z stage controller in order to execute the predetermined displacement of the solid immersion lens.

53. The inspection system of claim 49 further comprising a crash protection component; said crash protection component constraining travel of the solid immersion lens in order to substantially prevent damage to the solid immersion lens, the objective lens sub-system and/or the device under test.

54. A solid immersion lens holder comprising:
means for providing a self aligning solid immersion lens arrangement; said self aligning solid immersion lens arrangement allowing rotation of a solid immersion lens in order to allow contact/evanescent coupling between the solid immersion lens and a device under test; and means for constraining a force exerted on the device under test to a force that does not substantially distort or damage the device under test.

55. The solid immersion lens holder of claim 54 wherein said means for providing the self aligning solid immersion lens arrangement comprise means for retaining said solid immersion lens in the solid immersion lens holder.

56. The solid immersion lens holder of claim 55 further comprising: means for substantially preventing contamination from entering a region between said solid immersion lens and a receiving surface.

57. The solid immersion lens holder of claim 54 further comprising: means for thermally isolating said solid immersion lens.

58. The solid immersion lens holder of claim 54 further comprising means for substantially preventing contamination from entering a region between said solid immersion lens and a receiving surface.

59. The solid immersion lens holder of claim 54 further comprising: means for removing condensation from said solid immersion lens and other optical components.

60. The optics arrangement of claim 1 wherein said solid immersion lens receiving surface comprises a lubricity increasing material disposed on said solid immersion lens receiving surface.

61. The inspection system of claim 31 wherein said computer readable code further causes said one or more processors to disable X-Y-Z motions, if the desired displacement is not within the predetermined safe zone.

62. The optics arrangement of claim 2 wherein said housing further comprises a top surface disposed a predetermined height away from a center of the hemisphere; said top surface having a substantially central opening; a Characteristic dimension of said substantially central opening being selected to allow placement of said solid immersion lens onto said receiving surface; and wherein said retaining component is operatively connected to said housing by being disposed on said top surface.

63. The optics arrangement of claim 16 wherein said housing further comprises a top surface disposed a predetermined height away from a center of the hemisphere; said top surface having a substantially central opening; a characteristic dimension of said substantially central opening being selected to allow placement of said solid immersion lens onto said receiving surface; and wherein said anti-contamination component operatively connected to said housing is disposed on said top surface.

64. The inspection system of claim 34 wherein said housing further comprises a top surface disposed a predetermined height away from a center of the hemisphere; said top surface having a substantially central opening; a characteristic dimension of said substantially central opening being selected to allow placement of said solid immersion lens onto said receiving surace; and wherein said retaining component operatively connected to said housing is disposed on said top surface.

65. The inspection system of claim 41 wherein said housing further comprises a top surface disposed a predetermined height away from a center of the hemisphere; said top surface having a substantially central opening; a characteristic dimension of said substantially central opening being selected to allow placement of said solid immersion lens onto said receiving surface; and wherein said anti-contamination component operatively connected to said housing is disposed on said top surface.

66. A lens mount for mounting an arrangement housing and objective lens, said lens mount comprising:
a lens mount first section; said lens mount first section comprising:
a hollow mounting component having a substantially central channel running throughout; said substantially central channel being sized in order to accept said arrangement housing; said arrangement housing configured to receive the objective lens and a solid immersion lens;
the solid immersion lens being mounted on one end of said arrangement housing; said one end comprising a solid immersion lens receiving surface; said solid immersion lens receiving surface configured to provide for solid immersion lens rotation with respect to said solid immersion lens receiving surface; an instantaneous center of rotation of the solid immersion lens being at a center of curvature of the solid immersion lens;
a plurality of subcomponents disposed around and protruding from a periphery of said hollow mounting component; each subcomponent from said plurality of subcomponents being operatively attached to said hollow mounting component; each subcomponent having an opening, said opening being sized to receive a fastener;
a plurality of receiving components; each said subcomponent having a lower surface, said lower surface being opposite an upper surface receiving said fastener; said lower surface being sized to receive one receiving component from said plurality of receiving components; each receiving component having a receiving opening, said receiving opening being sized to receive said fastener; and a lens mount second section comprising:

a second section hollow component comprising a plurality of second section subcomponents disposed around and protruding from a periphery of said second section hollow component; each subcomponent from said plurality of second section subcomponents being operatively attached to said second section hollow component; one surface of each subcomponent having an opening, said opening being sized to receive a parcentricity preserving component; each second section subcomponents having a receiving opening for receiving one said fastener; each said parcentricity preserving component being sized to receive one of said receiving components; said lens mount first section and said lens mount second section being operatively connected by said fasteners; said lens mount first section and said lens mount second section being sized to substantially preserve parfocality.

67. The lens mount of claim 66 wherein said parcentricity preserving component comprises: two centering pins; each one of said two centering pins being disposed at an opposite side of said opening in said each one surface; said two centering pins being disposed such that a line through a center of a space between said two centering pins intersects a chief ray of said objective lens.

68. The lens mount of claim 67 wherein said receiving component comprises a truncated section of a sphere; said parcentricity preserving component being sized to receive one receiving component.

69. The lens mount of claim 66 Wherein said fastener is a screw.

* * * * *

UNITED STATES PATENT AND TRADEMARK OFFICE
CERTIFICATE OF CORRECTION

PATENT NO. : 8,767,199 B2
APPLICATION NO. : 12/905472
DATED : July 1, 2014
INVENTOR(S) : David M. Dozer et al.

It is certified that error appears in the above-identified patent and that said Letters Patent is hereby corrected as shown below:

In the Claims

In column 23, lines 15-16 (claim 39), "anti-contaminatim" should read -- anti-contamination --
In column 23, line 24 (claim 41), "comprising;" should read -- comprising: --
In column 26, line 8 (claim 62), "Characteristic" should read -- characteristic --
In column 26, line 29 (claim 64), "surace;" should read -- surface --
In column 28, line 16 (claim 69), "Wherein" should read -- wherein --

Signed and Sealed this
Second Day of September, 2014

Michelle K. Lee
*Deputy Director of the United States Patent and Trademark Office*